(12) United States Patent
Ono et al.

(10) Patent No.: US 10,380,661 B2
(45) Date of Patent: Aug. 13, 2019

(54) ENERGY CHARGING APPARATUS, ENERGY SAVING APPARATUS, ENERGY CONSUMING APPARATUS, AND METHOD OF MANAGING GREEN ENERGY

(75) Inventors: Tomoyuki Ono, Saitama (JP); Narumi Nagase, Tokyo (JP); Takayasu Kon, Tokyo (JP); Kei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 2013 days.

(21) Appl. No.: 13/405,949

(22) Filed: Feb. 27, 2012

(65) Prior Publication Data

US 2012/0253711 A1 Oct. 4, 2012

(30) Foreign Application Priority Data

Mar. 31, 2011 (JP) ................. 2011-078077

(51) Int. Cl.
  *G06Q 30/06* (2012.01)
  *G06Q 30/00* (2012.01)
(52) U.S. Cl.
  CPC ........... *G06Q 30/06* (2013.01); *G06Q 30/018* (2013.01)
(58) Field of Classification Search
  CPC .. G06Q 10/0639; G06Q 30/018; G06Q 30/06; G06C 30/18
  USPC ...................................................... 702/61
  See application file for complete search history.

(56) References Cited

U.S. PATENT DOCUMENTS

| | | | | |
|---|---|---|---|---|
| 7,913,181 B2 * | 3/2011 | Kumar et al. | ................. | 715/772 |
| 2002/0059035 A1 * | 5/2002 | Yagi et al. | ...................... | 702/59 |
| 2009/0228406 A1 * | 9/2009 | Lopez et al. | .................. | 705/412 |
| 2009/0234685 A1 * | 9/2009 | Tarbell et al. | ..................... | 705/7 |
| 2010/0010939 A1 * | 1/2010 | Arfin et al. | ..................... | 705/412 |
| 2010/0043870 A1 * | 2/2010 | Bennett et al. | ............... | 136/251 |
| 2010/0057544 A1 * | 3/2010 | Tarbell et al. | ............... | 705/14.1 |
| 2010/0131118 A1 * | 5/2010 | Jerome | ......................... | 700/295 |

(Continued)

FOREIGN PATENT DOCUMENTS

| | | | | |
|---|---|---|---|---|
| JP | 2003-108655 | 4/2003 | | |
| JP | 2010244107 | * 10/2010 | ............. | G06Q 50/00 |

OTHER PUBLICATIONS

European Patent Office, Extended European Search Report issued in connection with European Patent Application No. 12001520.1, dated Jul. 4, 2012_ (6 pp.).

*Primary Examiner* — Michael P Nghiem
*Assistant Examiner* — Dacthang P Ngo
(74) *Attorney, Agent, or Firm* — K&L Gates LLP

(57) ABSTRACT

An energy charging apparatus includes an energy charging unit charging green energy in an energy saving apparatus, a measured amount information acquisition unit acquiring measured amount information that indicates a charged amount of green energy measured by the energy saving apparatus from the corresponding energy saving apparatus, and a certificate issuance unit issuing a certificate for certifying an amount of green energy charged in the energy saving apparatus when a charged amount of green energy charged by the energy charging unit coincides with the charged amount of green energy shown in the measured amount information, wherein the certificate is managed in association with the energy saving apparatus and is discarded if the amount of green energy that is certified by the corresponding certificate is output from the energy saving apparatus.

3 Claims, 24 Drawing Sheets

(56) References Cited

U.S. PATENT DOCUMENTS

| | | | |
|---|---|---|---|
| 2010/0138066 A1* | 6/2010 | Kong | 700/295 |
| 2010/0235008 A1* | 9/2010 | Forbes et al. | 700/291 |
| 2010/0250440 A1* | 9/2010 | Wang et al. | 705/63 |
| 2010/0274408 A1* | 10/2010 | Stiles et al. | 700/296 |
| 2010/0306027 A1* | 12/2010 | Haugh | 705/10 |
| 2010/0318235 A1* | 12/2010 | Moss | 700/295 |
| 2010/0324956 A1* | 12/2010 | Lopez et al. | 705/7 |
| 2011/0046792 A1* | 2/2011 | Imes et al. | 700/278 |
| 2011/0208637 A1* | 8/2011 | Wakita et al. | 705/37 |

* cited by examiner

ENERGY CHARGING APPARATUS, ENERGY SAVING APPARATUS, ENERGY CONSUMING APPARATUS, AND METHOD OF MANAGING GREEN ENERGY

CROSS REFERENCES TO RELATED APPLICATIONS

The present application claims priority to Japanese Priority Patent Application JP 2011-078077 filed in the Japan Patent Office on Mar. 31, 2011, the entire content of which is hereby incorporated by reference.

BACKGROUND

The present disclosure relates to an energy charging apparatus, an energy saving apparatus, an energy consuming apparatus, and a method of managing green energy.

People are becoming more concerned about green energy from an increasing awareness of global environmental protection and a sense of crisis over depletion of fossil fuels. Green energy sources, for example, may be hydraulic power, geothermal heat, sunrays, solar heat, tidal movement, wind power, biomass, and the like. Accordingly, green energy can be produced while generating very little greenhouse effect. As people become more concerned about such green energy, trends are emerging recognizing the additional value of green energy. For example, there exists a green power certificate certifying the environmental value of power that is generated using renewable energy (hereinafter referred to as "green energy"). Further, Japanese Unexamined Patent Application Publication No. 2003-108655 discloses a construction for building a green power market in which individuals or small power consumers can participate.

However, the green power certificate is to certify the amount of green power that is generated using solar power generation facilities or wind power generation facilities. Because of this, unless power is consumed by a device that is directly connected to the solar power generation facilities or wind power generation facilities, it is difficult to determine whether or not the power that is consumed by the device is actually green power. Further, it is difficult to determine whether or not the power that is saved in a battery is green power. Here, although the power is described as an example of green energy, regardless of energy type, it is difficult to confirm if the energy saved in an energy saving apparatus is green energy or it is difficult to confirm if the energy consumed by the device is green energy.

SUMMARY

Accordingly, it is desirable to provide a new or improved energy charging apparatus, energy saving apparatus, energy consuming apparatus, and method of managing green energy, which can certify if saved green energy is indeed green energy.

According to an embodiment of the present disclosure, there is provided an energy charging apparatus which includes an energy charging unit charging green energy in an energy saving apparatus; a measured amount information acquisition unit acquiring measured amount information that indicates a charged amount of green energy measured by the energy saving apparatus from the corresponding energy saving apparatus; and a certificate issuance unit issuing a certificate for certifying an amount of green energy charged in the energy saving apparatus when a charged amount of green energy charged by the energy charging unit coincides with the charged amount of green energy shown in the measured amount information, wherein the certificate is managed in association with the energy saving apparatus and is discarded if the amount of green energy that is certified by the corresponding certificate is output from the energy saving apparatus.

As described above, according to the present disclosure, it becomes possible to certify if the saved green energy is indeed green energy.

Additional features and advantages are described herein, and will be apparent from the following Detailed Description and the figures.

DETAILED DESCRIPTION

Figure 1:
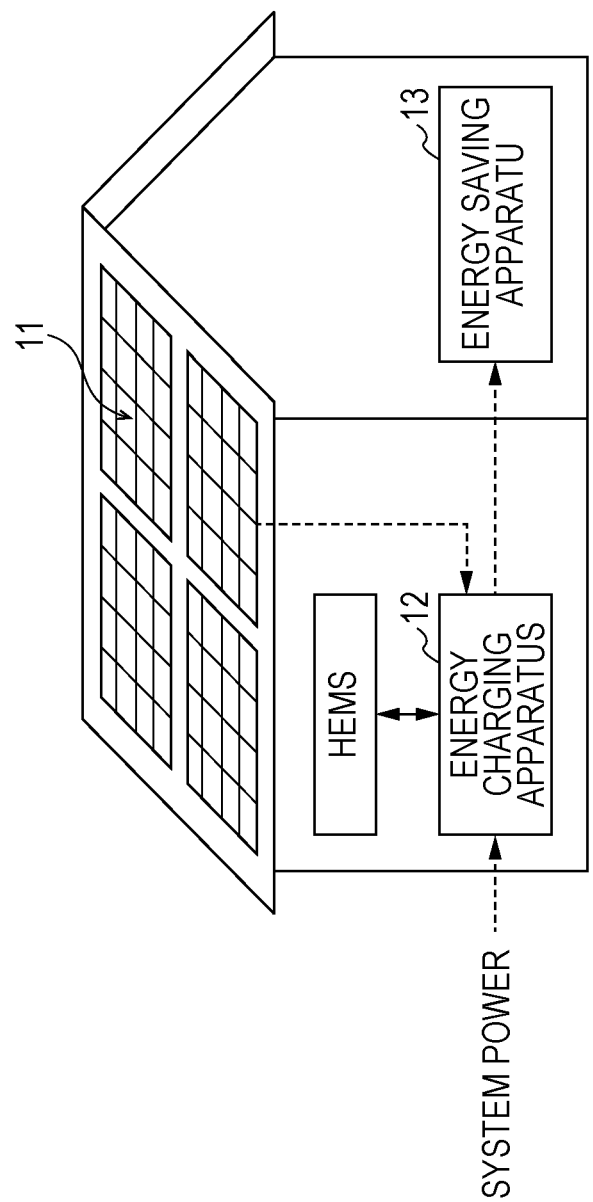
FIG. 1 is a diagram illustrating an energy supply and demand environment.

Hereinafter, according to an embodiment, the present disclosure will be described with reference to the accompanying drawings. Further, in the specification and drawings, the same reference numerals are used for constituent elements having substantially the same functional configurations, and duplicate explanation thereof will be omitted.

Regarding Sequence of Description

Here, the sequence of the description to be described hereinafter will be briefly described.

First, referring to FIG. 1, an energy supply and demand environment will be described. Next, referring to FIGS. 2 to 8, a first embodiment of the present disclosure will be described. Next, referring to FIGS. 9 to 15, a second embodiment of the present disclosure will be described. Next, referring to FIGS. 16 to 19, a third embodiment of the present disclosure will be described. Next, referring to FIGS. 20 and 21, a fourth embodiment of the present disclosure will be described. Next, referring to FIGS. 22 to 24, usage examples of a certificate related to first to fourth embodiments of the present disclosure will be described.

Last, the technical concept of the same embodiments will be summarized, and working effects that can be obtained from the corresponding technical concept will briefly be described.

DESCRIPTION ITEMS

1. Introduction
2. First Embodiment (Configuration to store a certificate in a saving apparatus)
2-1. Assumed Treatment Process
2-2. Configuration Example of an Energy Charging Apparatus 12
2-3. Configuration Example of an Energy Saving Apparatus 13
2-4. Operation of Each Apparatus in an Energy Saving Process
2-5. Operation of Each Apparatus in an Energy Consuming Process
3. Second Embodiment (Configuration to store a certificate in a cloud)
3-1. Assumed Treatment Process
3-2. Configuration Example of an Energy Charging Apparatus 12
3-3. Configuration Example of an Energy Saving Apparatus 13
3-4. Operation of an Apparatus in an Energy Saving Process
3-5. Operation of an Apparatus in an Energy Consuming Process
4. Third Embodiment (Configuration in which a consuming apparatus issues and stores a certificate in a saving apparatus)
4-1. Configuration Example of an Energy Consuming Apparatus 14
4-2. Configuration Example of an Energy Saving Apparatus 13
4-3. Operation of an Apparatus in an Energy Consuming Process
5. Fourth Embodiment (Configuration in which a consuming apparatus issues and stores a certificate in a cloud)
5-1. Configuration and Operation of an Apparatus in an Energy Consuming Process
6. Usage Example of a Certificate
6-1. Usage Example #1 (Functional limitations)
6-2. Usage Example #2 (Payoff to a user)
6-3. Usage Example #3 (Provision of service)
7. Supplement
8. Overview 1. Introduction Recently, the number of houses having solar power generation facilities has increased. Further, there have been attempts to propagate a home energy management system (HEMS) that collectively manages electric power at home to ordinary households. Much of the power generated by solar power generation facilities is consumed at home. Further, of the power generated by the solar power generation facilities, surplus power that could not be consumed in the home is sold to a power company.

The amount of power generated by the solar power generation facilities depends on the weather or the like. Because of this, the amount of surplus power that is sold to the power company becomes unstable. Purchasing unstable power becomes a heavy burden on the power company. As a result, in the present state, the selling price of the surplus power is lowered. In consideration of this situation, a construction for effectively utilizing the power saved in a battery, which is installed in a household to save the surplus power, such as at night or on rainy days has been propagated.

That is, even in an ordinary household, an energy supply and demand environment as shown in FIG. 1 is being put into place. Although the above description was about power, FIG. 1 shows a more abstract representation of an energy supply and demand environment in an ordinary household. For example, as shown in FIG. 1, a green energy generation apparatus 11, an energy charging apparatus 12, and an energy saving apparatus 13 are installed in the household. The energy charging apparatus 12 charges energy in the energy saving apparatus 13. Further, the energy saving apparatus 13 saves the energy.

To the energy charging apparatus 12, green energy that is generated by the green energy generation apparatus 11 is supplied. Further, to the energy charging apparatus 12, a power system is supplied. According to the above-described construction, the surplus power is sold to the power company. However, in the case where the amount of power that is generated by the solar power generation facilities is smaller than the power that is consumed in the home, a construction that purchases power from the power company may be installed. Accordingly, in the energy saving apparatus 13, the green energy generated by the green energy generation apparatus 11 and the energy derived from the power system are mixed.

The energy saved in the energy saving apparatus 13 is consumed by an energy consuming apparatus 14 (not illustrated) in the home or outside the home. As described above, in the energy saving apparatus 13, the green energy generated by the green energy generation apparatus 11 and the energy derived from the power system are mixed. Because of this, it is difficult to determine whether or not the energy consumed by the energy consuming apparatus 14 is green energy. Accordingly, even if it is intended to give some awards to people who have consumed green energy in order to encourage the consumption of green energy, it is difficult to certify the fact that the people have indeed consumed the green energy.

Accordingly, the inventors of this application have devised a construction that allows people to make sure that green energy is consumed while the energy saved in the energy saving apparatus 13 is consumed. Using this construction, it is possible to manufacture a device that operates using green energy or a device having an additional function when using green energy. Further, using this construction, it becomes possible to provide a special service or to give awards according to a consumed amount of green energy with respect to people who have consumed the green energy.

Further, since the above-described construction is a construction that certifies "consumption of green energy", it becomes possible to visualize a situation in which the green energy is actually consumed using this construction. For example, using this construction, it becomes possible to use a social network, to compare consumed amounts of green energy with friends, or to perform rankings of green energy consumption to reward people having higher ranking. Such an application contributes to the heightening of motivation of the people with respect to the green energy consumption.

Hereinafter, a construction that can certify the consumption of green energy will be described.

2. First Embodiment (Configuration to Store a Certificate in a Saving Apparatus)

The first embodiment of the present disclosure will be described.

2-1. Assumed Treatment Process

Figure 2:
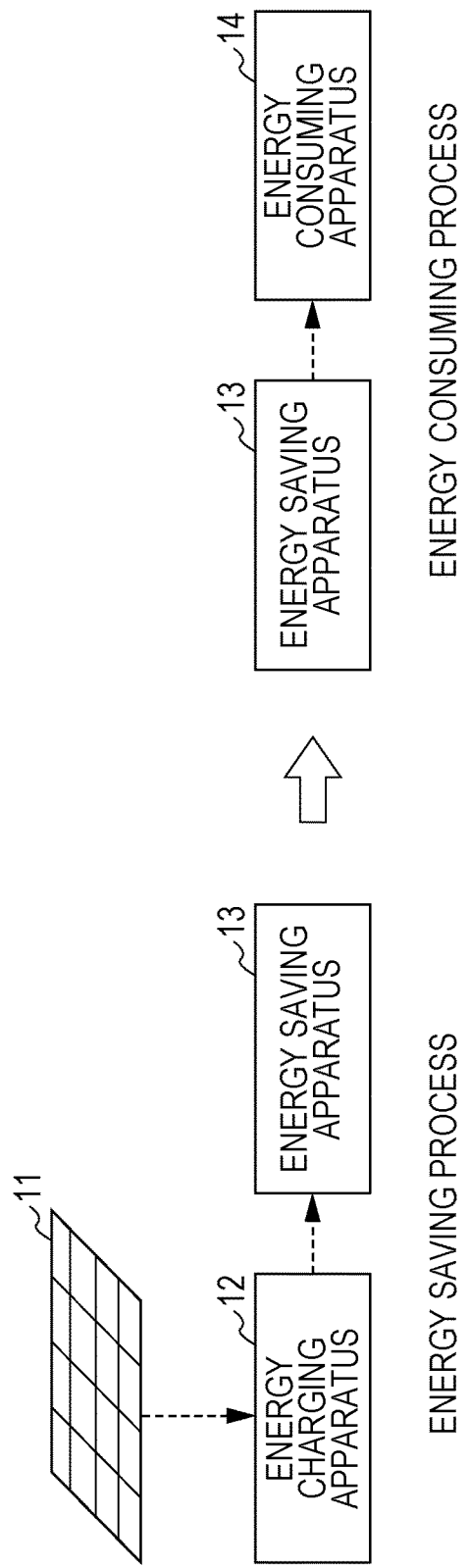
FIG. 2 is a diagram illustrating an energy saving and consuming process (first embodiment)

First, referring to FIG. 2, an assumed treatment process according to this embodiment will be described. FIG. 2 is a diagram illustrating an assumed treatment process according to this embodiment. In the following description, bold dashed arrows indicate the flow of energy, and solid arrows indicate the flow of information.

In this embodiment, an energy saving process and an energy consuming process as shown in FIG. 2 will be considered. Overview of treatment in the energy saving process and the energy consuming process is as follows.

In the energy saving process, an energy charging apparatus 12 charges energy that is generated by a green energy generation apparatus 11 in an energy saving apparatus 13. At this time, the energy charging apparatus 12 issues a certificate certifying that the energy charged in the energy saving apparatus 13 is green energy. On the other hand, in the energy consuming process, an energy consuming apparatus 14 consumes the energy that is saved in the energy saving apparatus 13. At this time, the energy consuming apparatus 14 certifies that the energy saved in the energy saving apparatus 13 is green energy using the certificate issued by the energy charging apparatus 12.

The assumed treatment process according to this embodiment has been described. Hereinafter, a configuration example of the energy charging apparatus 12, a configuration example of the energy saving apparatus 13, the operation of each apparatus in the energy saving process, and the operation of each apparatus in the energy consuming process will be described in detail.

2-2. Configuration Example of an Energy Charging Apparatus 12

Figure 3:
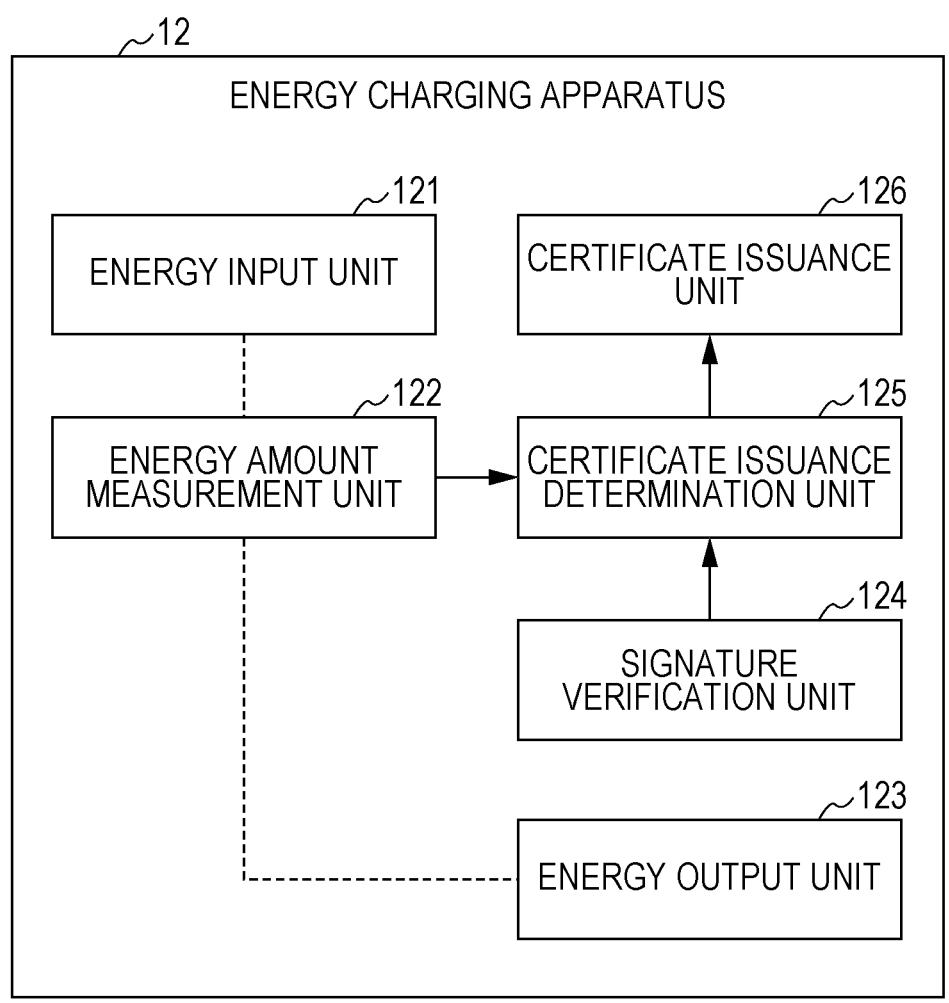
FIG. 3 is a diagram illustrating a configuration example (first embodiment) of an energy charging apparatus.

Referring to FIG. 3, a configuration example of the energy charging apparatus 12 according to this embodiment will be described. FIG. 3 is a diagram illustrating a configuration example of the energy charging apparatus 12 according to this embodiment.

As shown in FIG. 3, the energy charging apparatus 12 mainly includes an energy input unit 121, an energy amount measurement unit 122, an energy output unit 123, a signature verification unit 124, a certificate issuance determination unit 125, and a certificate issuance unit 126.

The energy input unit 121 is an input terminal for inputting green energy that is generated by the green energy generation apparatus 11. Further, the energy input unit 121 is connected to the energy amount measurement unit 122.

Through this, the energy input to the energy input unit 121 is input to the energy amount measurement unit 122. If the energy is input, the energy amount measurement unit 122 measures the amount of the input energy (hereinafter, charged amount). Further, the energy amount measurement unit 122 inputs charged amount information to the certificate issuance determination unit 125.

Further, the energy amount measurement unit 122 is connected to the energy output unit 123. Through this, the energy input to the energy amount measurement unit 122 is input to the energy output unit 123. The energy output unit 123 is an output terminal for outputting the energy. For example, if the energy saving apparatus 13 is connected to the energy output unit 123, the energy input to the energy output unit 123 is output toward the energy saving apparatus 13.

The signature verification unit 124 is a constituent element that verifies an electronic signature. For example, when an electronic signature is acquired from the energy saving apparatus 13, the signature verification unit 124 verifies the electronic signature using a public key of the energy saving apparatus 13. As described hereinafter, the energy saving apparatus 13 measures an amount of energy (hereinafter, saved amount) that is supplied from the energy charging apparatus 12, and provides saved amount information with an electronic signature attached thereto to the energy charging apparatus 12. Accordingly, the signature verification unit 124 verifies that the provided saved amount information is information that is indeed provided from the energy saving apparatus 13.

The result of the verification through the signature verification unit 124 is input to the certificate issuance determination unit 125. At this time, the signature verification unit 124 inputs information on the saved amount that is measured by the energy saving apparatus 13 to the certificate issuance determination unit 125. That is, to the certificate issuance determination unit 125, charged amount information and saved amount information are input.

If the charged amount information and the saved amount information are input, the certificate issuance determination unit 125 compares the charged amount with the saved amount on the basis of the input information. If the charged amount coincides with the saved amount within an acceptable error range, the certificate issuance determination unit 125 permits the issuance of a certificate. On the other hand, if the charged amount does not coincide with the saved amount within the acceptable error range, the certificate issuance determination unit 125 does not permit the issuance of the certificate. In the case of permitting the issuance of the certificate, the certificate issuance determination unit 125 notifies the certificate issuance unit 126 of the permission of the issuance of the certificate.

If the permission of the issuance of the certificate is notified, the certificate issuance unit 126 issues the certificate that certifies that the energy saved in the energy saving apparatus 13 is green energy. The certificate issued by the certificate issuance unit 126 is provided to the energy saving apparatus 13. Further, the certificate includes the saved amount information and identification information for identifying the energy saving apparatus 13.

As described above, the configuration example of the energy charging apparatus 12 according to this embodiment has been described. Further, in addition to the constituent elements illustrated in FIG. 3, the energy charging apparatus 12 may include an input device, an output device, and a communication device mounted thereon. The input device, for example, may be a touch sensor or a button. Further, the output device, for example, may be a display device or an audio output device. The communication device, for example, may be a wireless communication interface or a wired communication interface.

Further, the energy charging apparatus 12 has an input terminal (not illustrated) mounted thereon to input the power system. However, the energy derived from the power system is considered as non-green energy. Because of this, when the power system is input to the input terminal, the energy charging apparatus 12 does not perform the process for issuing the certificate. Accordingly, even if energy that is derived from the power system is saved in the energy saving apparatus 13, no certificate is provided to the energy saving apparatus 13.

2-3. Configuration Example of an Energy Saving Apparatus 13

Figure 4:
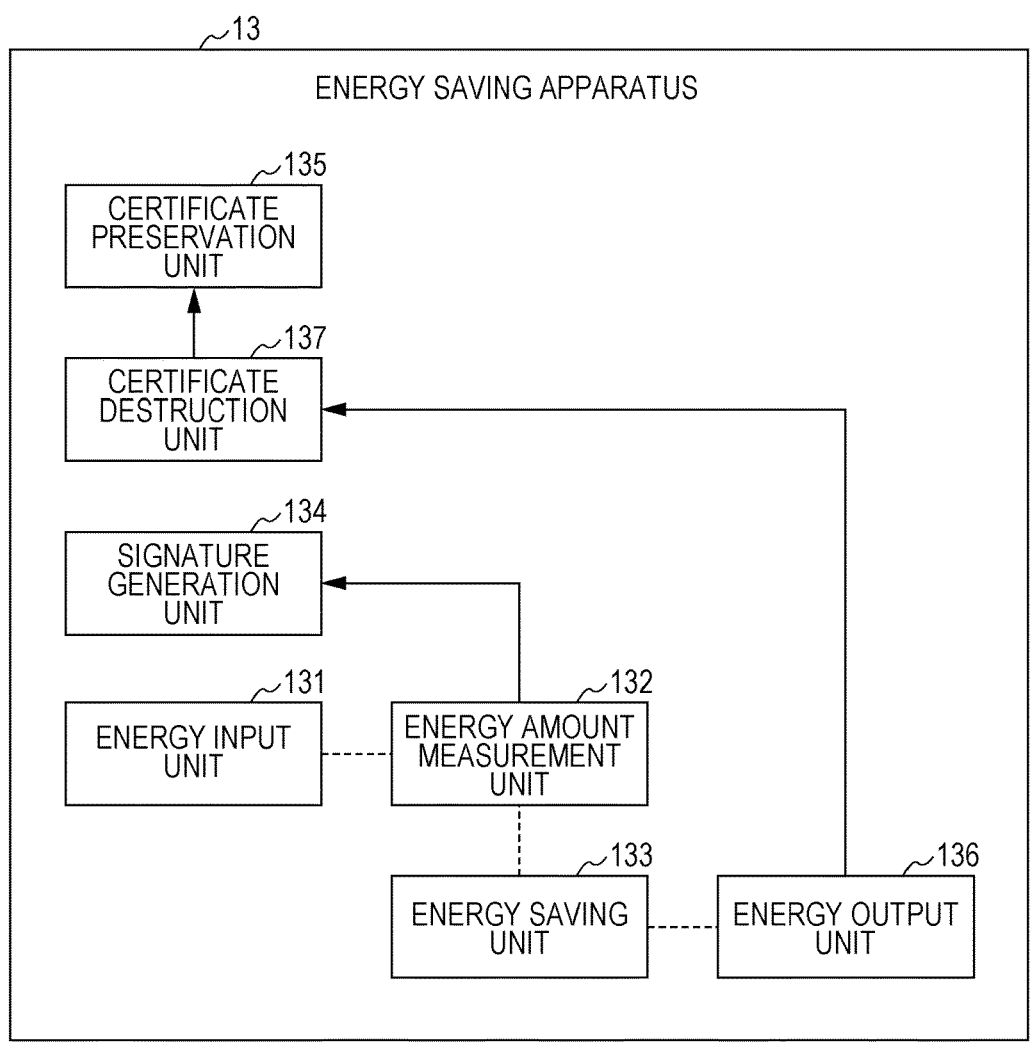
FIG. 4 is a diagram illustrating a configuration example (first embodiment) of an energy saving apparatus.

Next, referring to FIG. 4, a configuration example of the energy saving apparatus 13 according to this embodiment will be described. FIG. 4 is a diagram illustrating a configuration example of the energy saving apparatus 13 according to this embodiment.

As shown in FIG. 4, the energy saving apparatus 13 mainly includes an energy input unit 131, an energy amount measurement unit 132, an energy saving unit 133, a signature generation unit 134, a certificate preservation unit 135, an energy output unit 136, and a certificate discard unit 137.

The energy input unit 131 is an input terminal for inputting energy from the energy charging apparatus 12. The energy input unit 131 is connected to the energy amount measurement unit 132. Through this, the energy input to the energy input unit 131 is input to the energy amount measurement unit 132. If the energy is input, the energy amount measurement unit 132 measures the amount of the input energy (saved amount). Further, the energy amount measurement unit 132 inputs the saved amount information to the signature generation unit 134.

Further, the energy amount measurement unit 132 is connected to the energy saving unit 133. Through this, the energy input to the energy amount measurement unit 132 is input to the energy saving unit 133. If the energy is input, the energy saving unit 133 saves the energy. Further, the energy saving unit 133 is connected to the energy output unit 136. Through this, the energy saving unit 133 can input the saved energy to the energy output unit 136. Further, the energy output unit 136 is an output terminal for outputting the energy toward the energy consuming apparatus 14.

If saved amount information is input from the energy amount measurement unit 132, the signature generation unit 134 generates an electronic signature for the input saved amount information. For example, the signature generation unit 134 generates the electronic signature using a secret key that constitutes a pair together with the public key of the energy saving apparatus 13. Further, the signature generation unit 134 gives the generated electronic signature to the saved amount information and provides the saved amount information with the electronic signature to the energy charging apparatus 12.

As described above, if the verification of the electronic signature is successful, the energy charging apparatus 12, which has acquired the saved amount information with the electronic signature, issues a certificate that certifies that the energy saved in the energy saving apparatus 13 is green energy. Further, energy charging apparatus 12 provides the issued certificate to the energy saving apparatus 13. If the certificate issued by the energy charging apparatus 12 is acquired, the energy saving apparatus 13 stores the acquired certificate in the certificate preservation unit 135. The certificate preservation unit 135 preserves the stored certificate.

If the energy consuming apparatus 14 is connected to the energy output unit 136, the energy saved in the energy saving unit 133 is input to the energy saving apparatus 14 through the energy output unit 136. At this time, the energy output unit 136 notifies the certificate discard unit 137 that the energy saved in the energy saving unit 133 is input to the energy consuming apparatus 14. The certificate discard unit 137 that has received this notification discards the certificate stored in the certificate preservation unit 135. Further, the verification process can be simplified through discarding of the certificate according to the output of the energy.

As described, the configuration example of the energy saving apparatus 13 according to this embodiment has been described. Further, in addition to the constituent elements illustrated in FIG. 4, the energy saving apparatus 13 may include an input device, an output device, and a communication device mounted thereon. The input device, for example, may be a touch sensor or a button. Further, the output device, for example, may be a display device or an audio output device. The communication device, for example, may be a wireless communication interface or a wired communication interface.

2-4. Operation of Each Apparatus in an Energy Saving Process

Figure 5:
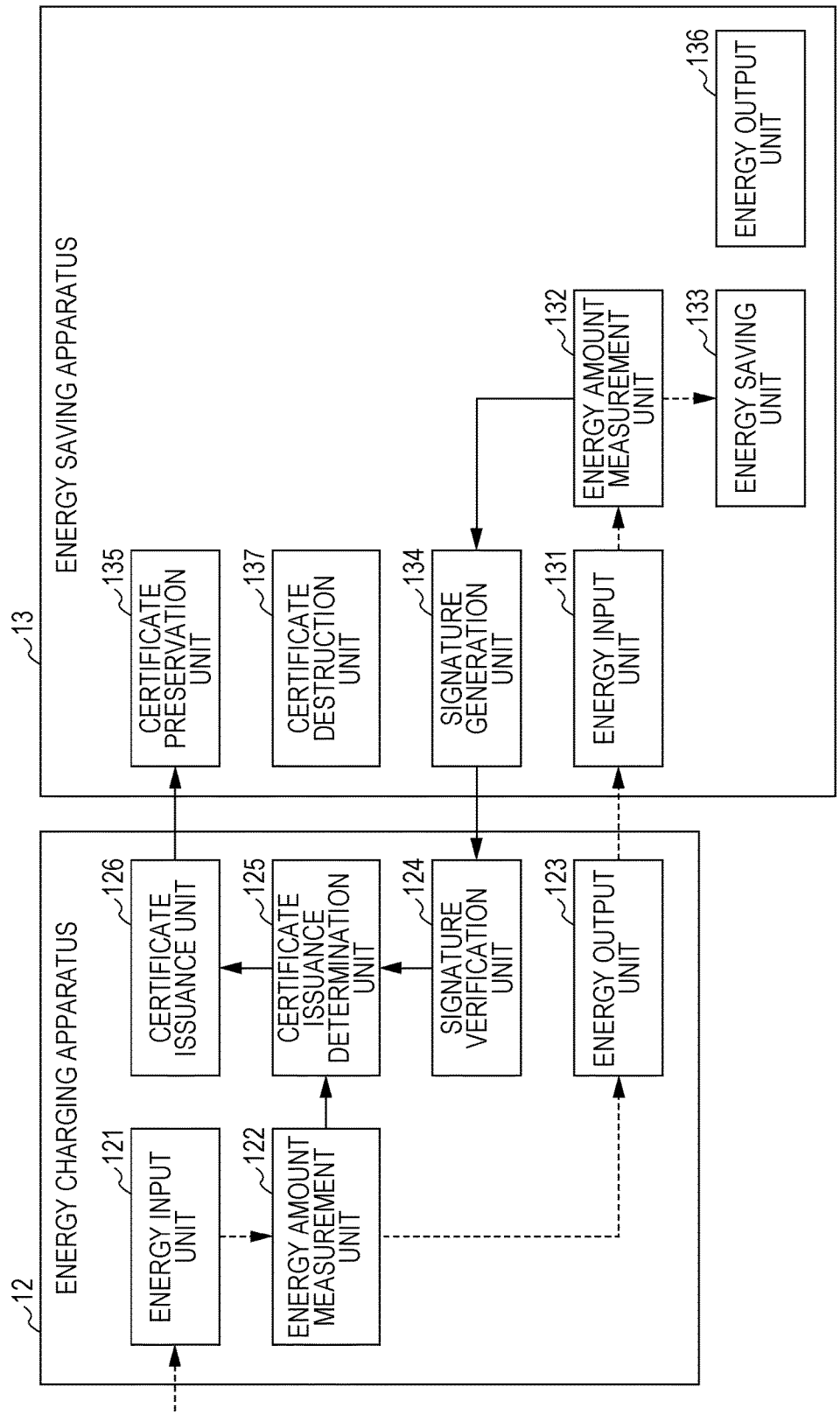
FIG. 5 is a diagram illustrating an energy saving process (first embodiment)
Figure 6:
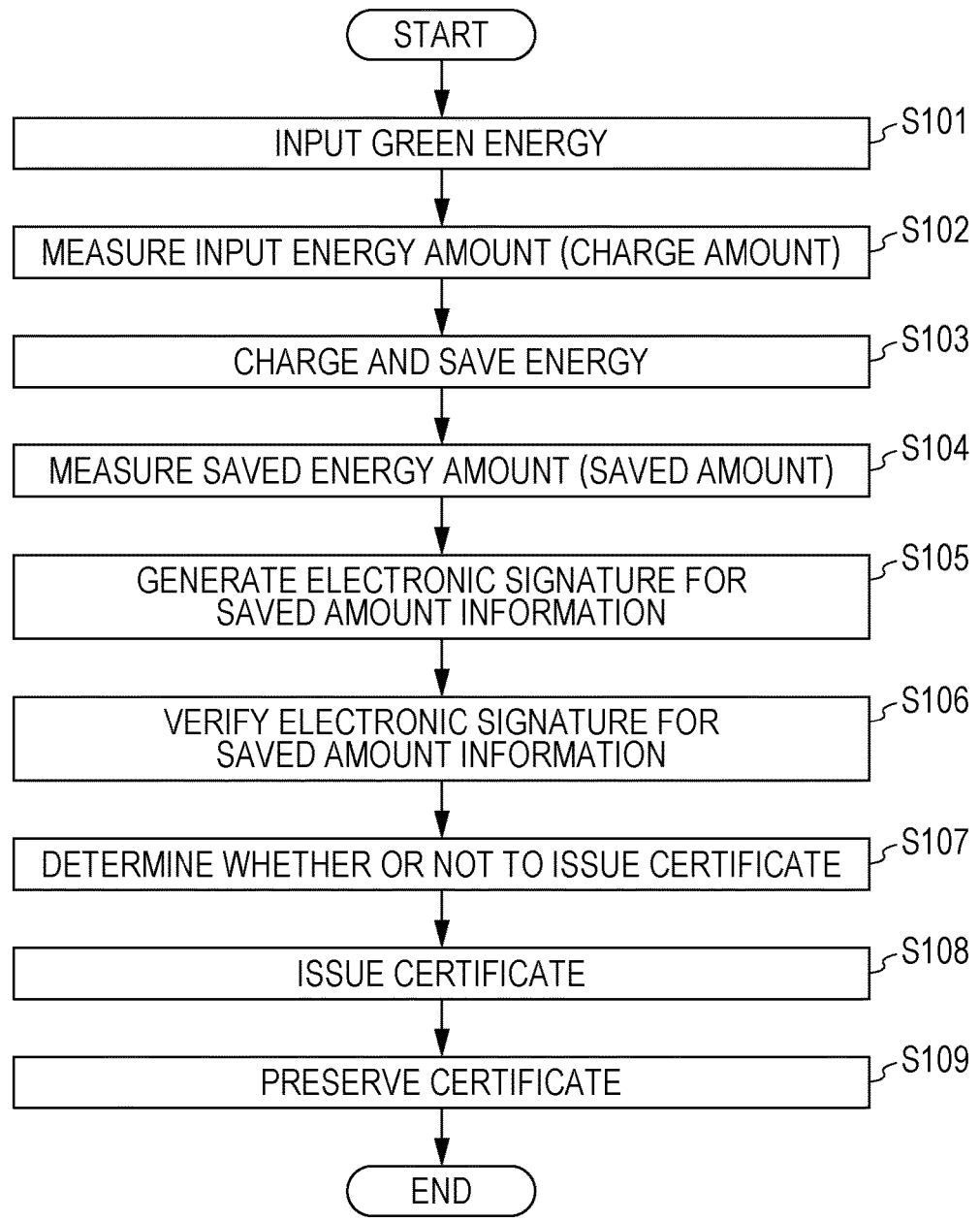
FIG. 6 is a diagram illustrating an energy saving process (first embodiment)

Next, referring to FIGS. 5 and 6, the operation of each apparatus in an energy saving process will be described. FIGS. 5 and 6 are explanatory diagrams illustrating the operation of each apparatus in the energy saving process.

First, the energy that is generated from the green energy generation apparatus 11 is input to the energy input unit 121 of the energy charging apparatus 12 (S101). If the energy is input, the energy charging apparatus 12 measures the amount of energy (charged amount) input to the energy input unit 121 by means of the function of the energy amount measurement unit 122 (S102). The charged amount information is input to the certificate issuance determination unit 125. Further, the energy charging apparatus 12 charges the energy in the energy saving apparatus 13 through the energy output unit 123 (S103).

Further, the energy charged in the energy saving apparatus 13 is saved in the energy saving unit 133 (S103). At this time, the energy saving apparatus 13 measures the amount of energy (saved amount) saved in the energy saving unit 133 by means of the function of the energy amount measurement unit 132 (S104). The saved amount information is input to the signature generation unit 134. Next, the energy saving apparatus 13 generates an electronic signature for the input saved amount information by means of the function of the signature generation unit 134 (S105), and provides the generated electronic signature to the energy charging apparatus 12.

Next, the energy charging apparatus 12 verifies the electronic signature that is acquired from the energy saving apparatus 13 by means of the function of the signature verification unit 124 (S106). If the verification of the electronic signature is successful, the energy charging apparatus 12 determines whether or not to issue the certificate by means of the function of the certificate issuance determination unit 125 (S107). For example, the energy charging apparatus 12 determines whether or not the charged amount coincides with the saved amount within an acceptable error range by means of the function of the certificate issuance determination unit 125. If the charged amount coincides with the saved amount within the acceptable error range, the energy charging apparatus 12 issues a certificate by means of the function of the certificate issuance unit 126 (S108), and provides the certificate to the energy saving apparatus 13.

Next, the energy saving apparatus 13 acquires the certificate issued by the energy charging apparatus 12, and stores the acquired certificate in the certificate preservation unit 135 (S109). If the certificate is stored in the certificate preservation unit 135, a series of energy saving processes is finished. Further, if the verification of the electronic signature fails in step S106, the certificate is not issued. Further, if the charged amount does not coincide with the saved amount within the acceptable error range in step S107, the certificate is not issued.

The operation of each apparatus in the energy saving process has been described. Further, if the energy saving apparatus 13 already preserves the certificate before starting the energy saving process, the energy charging apparatus 12 can confirm the amount of green energy saved in the energy saving apparatus 13 on the basis of the saved amount information included in the certificate. Accordingly, the energy charging apparatus 12 may be configured to issue a certificate for the total amount of green energy saved in the energy saving apparatus 13 after charging the energy.

2-5. Operation of Each Apparatus in an Energy Consuming Process

Figure 7:
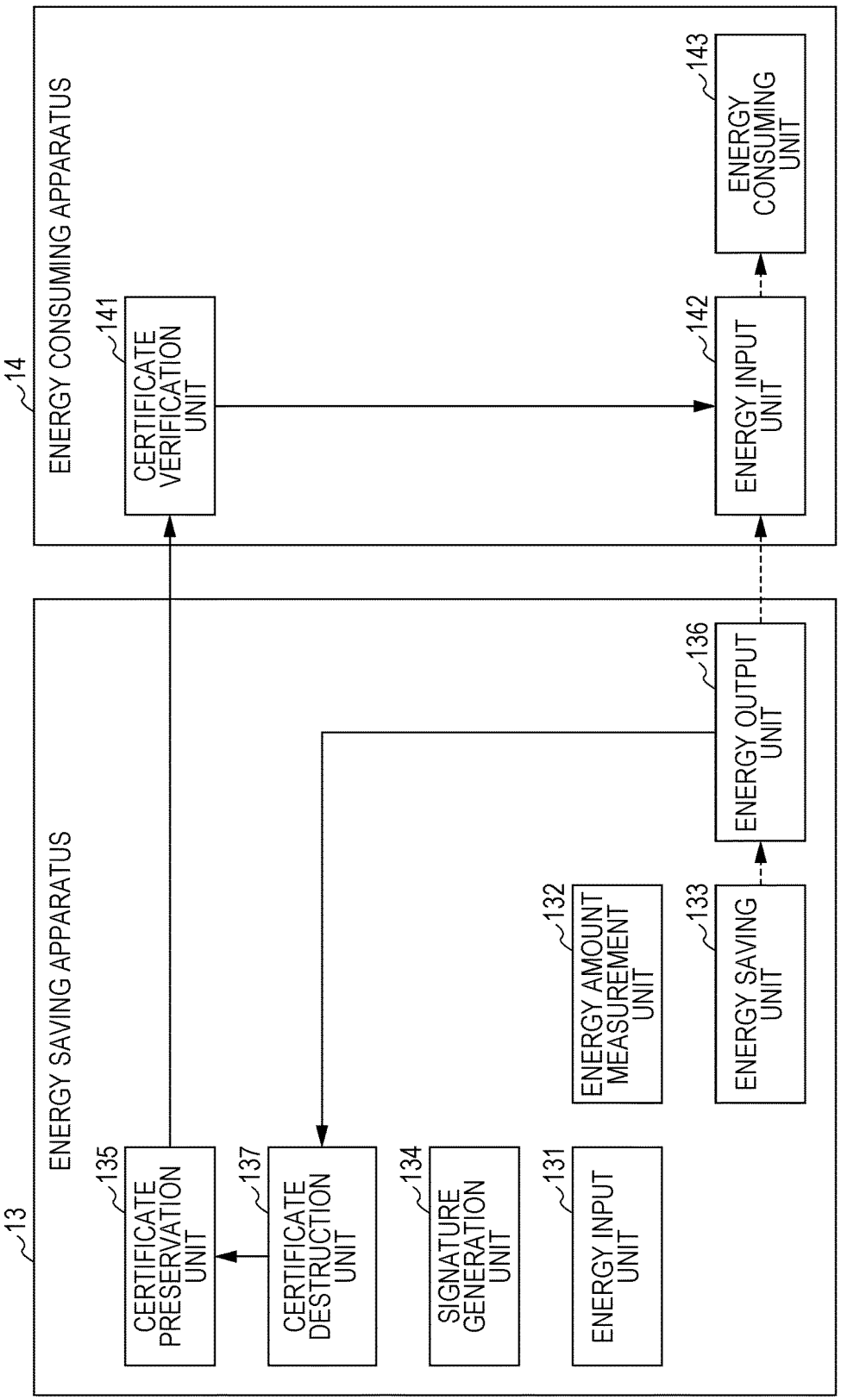
FIG. 7 is a diagram illustrating an energy consuming process (first embodiment)
Figure 8:
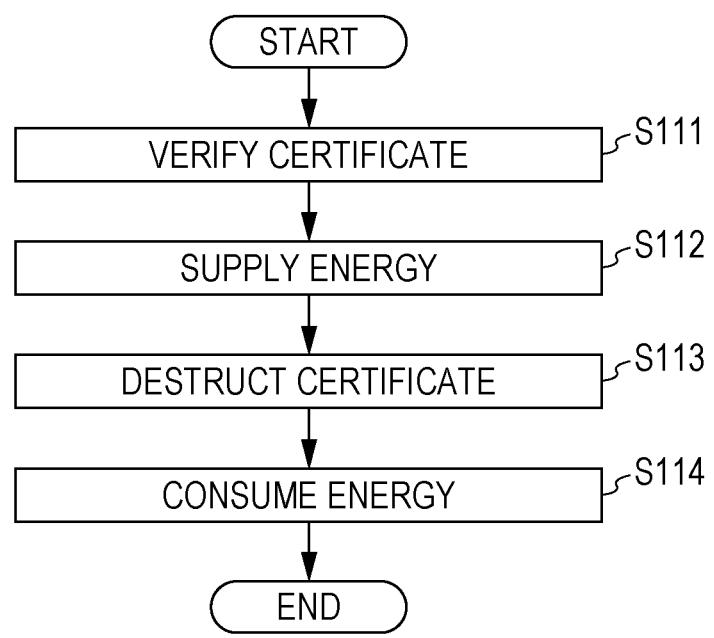
FIG. 8 is a diagram illustrating an energy consuming process (first embodiment)

Next, referring to FIGS. 7 and 8, the operation of each apparatus in the energy consuming process will be described. FIGS. 7 and 8 are explanatory diagrams illustrating the operation of each apparatus in the energy consuming process.

First, a configuration example of the energy consuming apparatus 14 will be briefly described. As shown in FIG. 7, the energy consuming apparatus 14 mainly includes a certificate verification unit 141, an energy input unit 142, and an energy consuming unit 143. The certificate verification unit 141 is a constituent element that verifies the validity of the certificate. The energy input unit 142 is an input terminal for inputting the energy. Further, the energy consuming unit 143 is a constituent element that consumes the energy. If the validity of the certificate is confirmed by the certificate verification unit 141, the energy input unit 142 receives an input of the energy. Through this, if the validity of the certificate is not confirmed, the energy is not input to the energy consuming unit 143. As described above, the configuration example of the energy consuming apparatus 14 has been described.

Next, both FIGS. 7 and 8 are referred to. If the energy consuming apparatus 14 and the energy saving apparatus 13 are connected to each other, a certificate is provided from the energy saving apparatus 13 to the energy saving apparatus 14. If the certificate is provided, the energy consuming apparatus 14 verifies the validity of the certificate by means of the function of the certificate verification unit 141 (S111). If the validity of the certificate is confirmed, the energy consuming apparatus 14 starts reception of the energy. Thereafter, the energy supply starts (S112). If the energy supply to the energy consuming apparatus 14 starts, the energy saving apparatus 13 discards the certificate stored in the certificate preservation unit 135 by means of the function of the certificate discard unit 137 (S113).

The energy supplied to the energy consuming apparatus 14 is input to the energy consuming unit 143 through the energy input unit 142. If the energy is input, the energy consuming apparatus 14 consumes the input energy by means of the function of the energy consuming unit 143 (S114). If the energy is consumed by the energy consuming unit 143, a series of energy consuming processes is finished.

Further, if the verification of the certificate fails in step S111, the supply of energy to the energy consuming apparatus 14 is not performed. Further, if the energy supply is not performed, the discard of the certificate is also not performed.

As described above, the operation of each apparatus in the energy consuming process has been described. Further, the above description is about the configuration example of the energy consuming apparatus 14 that operates using only the green energy. As shown in the configuration example, using eh certificate, a construction that controls energy reception depending on whether or not the supplied energy is green energy can be realized. Further, through modification of this construction, it is also possible to realize a construction that limits the function of the energy consuming apparatus 14 if the supplied energy is non-green energy, rather than completely denying the acceptance of the non-green energy.

As described above, the first embodiment of the present disclosure has been described. If the technology according to this embodiment is used, it can be confirmed whether or not the energy that is supplied from the energy saving apparatus 13 is green energy using the certificate. Through this, it becomes possible to realize a device that operates with green energy or a device having an improved function through the use of green energy.

3. Second Embodiment (Configuration to Store a Certificate in a Cloud)

Next, a second embodiment of the present disclosure will be described. This embodiment relates to a configuration that preserves the certificate issued by the energy charging apparatus 12 in the energy saving process in an external server 15 (for example, a cloud system or the like) in association with the energy saving apparatus 13.

3-1. Assumed Treatment Process

Figure 9:
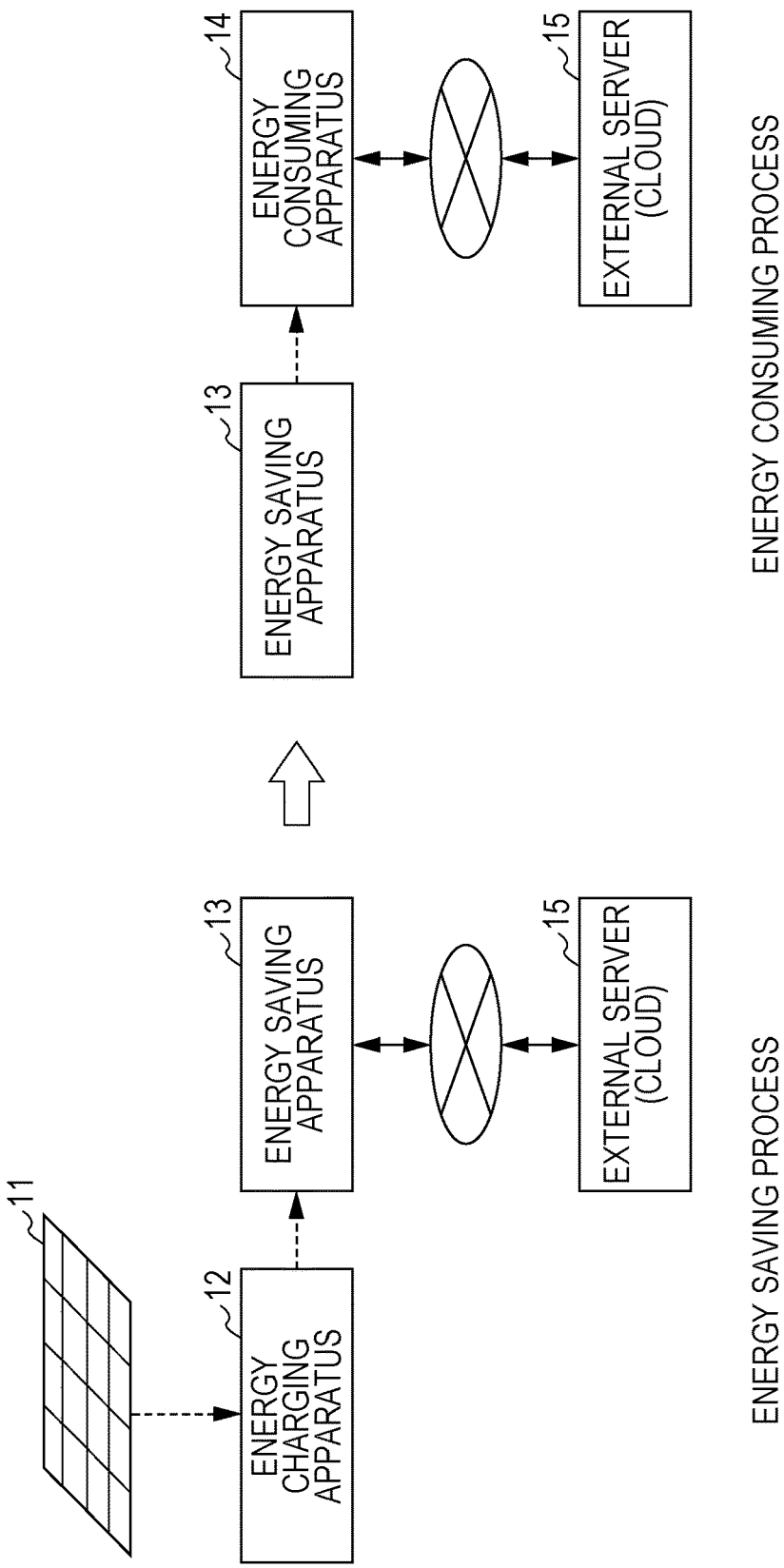
FIG. 9 is a diagram illustrating an energy saving and consuming process (second embodiment)

First, referring to FIG. 9, an assumed treatment process according to this embodiment will be described. FIG. 9 is a diagram illustrating an assumed treatment process according to this embodiment. In the following description, bold dashed arrows indicate the flow of energy, and solid arrows indicate the flow of information.

In this embodiment, an energy saving process and an energy consuming process as shown in FIG. 9 will be considered. Overview of treatment in the energy saving process and the energy consuming process is as follows.

In the energy saving process, an energy charging apparatus 12 charges energy that is generated by a green energy generation apparatus 11 in an energy saving apparatus 13. At this time, the energy charging apparatus 12 issues a certificate certifying that the energy charged in the energy saving apparatus 13 is green energy. This certificate may be in association with the energy saving apparatus 13, and is stored in an external server 15 on a network. For example, the external server 15 preserves identification information for identifying the energy saving apparatus 13 and the certificate in association with each other.

On the other hand, in the energy consuming process, an energy consuming apparatus 14 consumes the energy that is saved in the energy saving apparatus 13. At this time, the energy consuming apparatus 14 acquires the certificate issued by the energy charging apparatus 12 from the external server 15. Further, the energy consuming apparatus 14 certifies that the energy saved in the energy saving apparatus 13 is green energy using the acquired certificate and the identification information that is in association with the certificate.

The assumed treatment process according to this embodiment has been described. Hereinafter, a configuration example of the energy charging apparatus 12, a configuration example of the energy saving apparatus 13, the operation of each apparatus in the energy saving process, and the operation of each apparatus in the energy consuming process will be described in detail.

3-2. Configuration Example of an Energy Charging Apparatus 12

Figure 10:
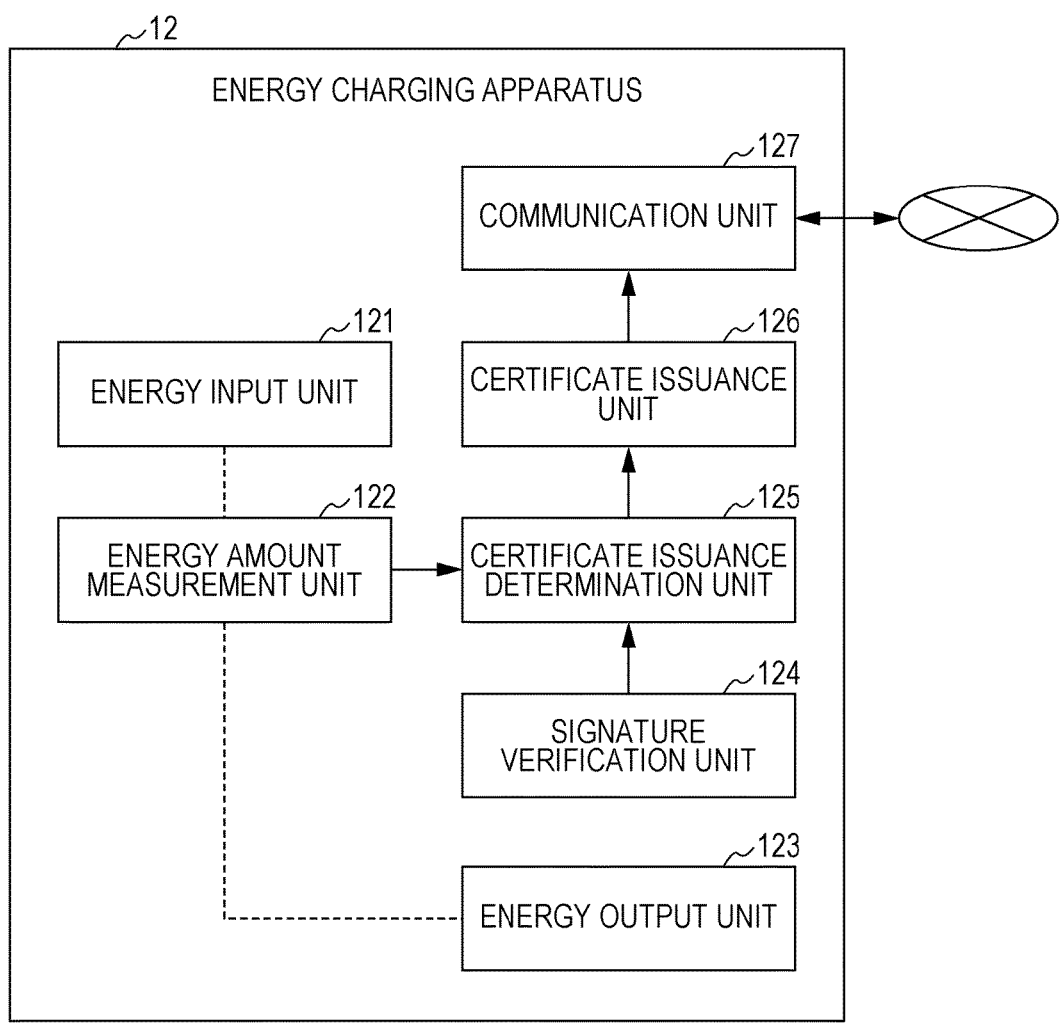
FIG. 10 is a diagram illustrating a configuration example (second embodiment) of an energy charging apparatus.

Referring to FIG. 10, a configuration example of the energy charging apparatus 12 according to this embodiment will be described. FIG. 10 is a diagram illustrating a configuration example of the energy charging apparatus 12 according to this embodiment.

As shown in FIG. 10, the energy charging apparatus 12 mainly includes an energy input unit 121, an energy amount measurement unit 122, an energy output unit 123, a signature verification unit 124, a certificate issuance determination unit 125, a certificate issuance unit 126, and a communication unit 127. The main difference between the energy charging apparatus 12 according to the first embodiment and the energy charging apparatus 12 according to this embodiment is in the presence of the communication unit 127.

The energy input unit 121 is an input terminal for inputting green energy that is generated by the green energy generation apparatus 11. Further, the energy input unit 121 is connected to the energy amount measurement unit 122. Through this, the energy input to the energy input unit 121 is input to the energy amount measurement unit 122. If the energy is input, the energy amount measurement unit 122 measures the amount of the input energy (charged amount). Further, the energy amount measurement unit 122 inputs charged amount information to the certificate issuance determination unit 125.

Further, the energy amount measurement unit 122 is connected to the energy output unit 123. Through this, the energy input to the energy amount measurement unit 122 is input to the energy output unit 123. The energy output unit 123 is an output terminal for outputting the energy. For example, if the energy saving apparatus 13 is connected to the energy output unit 123, the energy input to the energy output unit 123 is output toward the energy saving apparatus 13.

The signature verification unit 124 is a constituent element that verifies an electronic signature. For example, when an electronic signature is acquired from the energy saving apparatus 13, the signature verification unit 124 verifies the electronic signature using a public key of the energy saving apparatus 13. As described hereinafter, the energy saving apparatus 13 measures an amount of energy (saved amount) that is supplied from the energy charging apparatus 12, and provides saved amount information with an electronic signature attached thereto to the energy charging apparatus 12. Accordingly, the signature verification unit 124 verifies that the provided saved amount information is information that is indeed provided from the energy saving apparatus 13.

The result of the verification through the signature verification unit 124 is input to the certificate issuance determination unit 125. At this time, the signature verification unit 124 inputs information on the saved amount that is measured by the energy saving apparatus 13 to the certificate issuance determination unit 125. That is, to the certificate issuance determination unit 125, charged amount information and saved amount information are input.

If the charged amount information and the saved amount information are input, the certificate issuance determination unit 125 compares the charged amount with the saved amount on the basis of the input information. If the charged amount coincides with the saved amount within an acceptable error range, the certificate issuance determination unit 125 permits the issuance of a certificate. On the other hand, if the charged amount does not coincide with the saved amount within the acceptable error range, the certificate issuance determination unit 125 does not permit the issuance of the certificate. In the case of permitting the issuance of the certificate, the certificate issuance determination unit 125 notifies the certificate issuance unit 126 of the permission of the issuance of the certificate.

If the permission of the issuance of the certificate is notified, the certificate issuance unit 126 issues the certificate that certifies that the energy saved in the energy saving apparatus 13 is green energy. The certificate issued by the certificate issuance unit 126 is provided to the external server 15 through the communication unit 127. Further, the certificate includes the saved amount information and identification information for identifying the energy saving apparatus 13.

As described above, the configuration example of the energy charging apparatus 12 according to this embodiment has been described. Further, in addition to the constituent elements illustrated in FIG. 10, the energy charging apparatus 12 may include an input device, an output device, and the like, which are mounted thereon. The input device, for example, may be a touch sensor or a button. Further, the output device, for example, may be a display device or an audio output device.

Further, the energy charging apparatus 12 has an input terminal (not illustrated) mounted thereon to input the power system. However, the energy derived from the power system is considered as non-green energy. Because of this, when the power system is input to the input terminal, the energy charging apparatus 12 does not perform the process for issuing the certificate. Accordingly, even if energy that is derived from the power system is saved in the energy saving apparatus 13, no certificate is provided to the energy saving apparatus 13.

3-3. Configuration Example of an Energy Saving Apparatus 13

Figure 11:
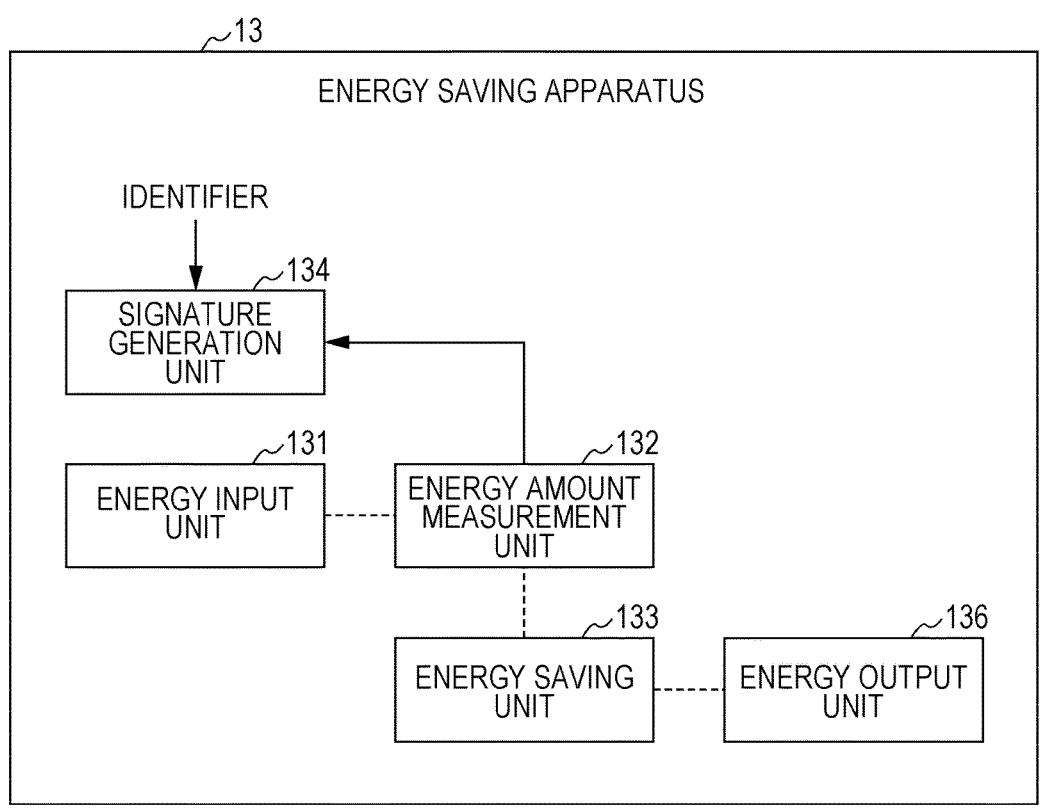
FIG. 11 is a diagram illustrating a configuration example (second embodiment) of an energy saving apparatus.

Next, referring to FIG. 11, a configuration example of the energy saving apparatus 13 according to this embodiment will be described. FIG. 11 is a diagram illustrating a configuration example of the energy saving apparatus 13 according to this embodiment.

As shown in FIG. 11, the energy saving apparatus 13 mainly includes an energy input unit 131, an energy amount measurement unit 132, an energy saving unit 133, a signature generation unit 134, and an energy output unit 136. The difference between the energy saving apparatus 13 according to the first embodiment and the energy saving apparatus 13 according to this embodiment is in the presence of the certificate preservation unit 135 and the certificate discard unit 137.

The energy input unit 131 is an input terminal for inputting energy from the energy charging apparatus 12. The energy input unit 131 is connected to the energy amount measurement unit 132. Through this, the energy input to the energy input unit 131 is input to the energy amount measurement unit 132. If the energy is input, the energy amount measurement unit 132 measures the amount of the input energy (saved amount). Further, the energy amount measurement unit 132 inputs the saved amount information to the signature generation unit 134.

Further, the energy amount measurement unit 132 is connected to the energy saving unit 133. Through this, the energy input to the energy amount measurement unit 132 is input to the energy saving unit 133. If the energy is input, the energy saving unit 133 saves the energy. Further, the energy saving unit 133 is connected to the energy output unit 136. Through this, the energy saving unit 133 can input the saved energy to the energy output unit 136. Further, the energy output unit 136 is an output terminal for outputting the energy toward the energy consuming apparatus 14.

If saved amount information is input from the energy amount measurement unit 132, the signature generation unit 134 generates an electronic signature for the input saved amount information. For example, the signature generation unit 134 generates the electronic signature using a secret key that constitutes a pair together with the public key of the energy saving apparatus 13. Further, the signature generation unit 134 gives the generated electronic signature to the saved amount information and provides the saved amount information with the electronic signature to the energy charging apparatus 12. At this time, the signature generation unit 134 provides identification information (identifier) for identifying the energy saving apparatus 13 to the energy charging apparatus 12.

Further, if the energy consuming apparatus 14 is connected to the energy output unit 136, the energy saved in the energy saving apparatus 133 is input to the energy consuming apparatus 14 through the energy output unit 136.

As described, the configuration example of the energy saving apparatus 13 according to this embodiment has been described. Further, in addition to the constituent elements illustrated in FIG. 11, the energy saving apparatus 13 may include an input device, an output device, and a communication device mounted thereon. The input device, for example, may be a touch sensor or a button. Further, the output device, for example, may be a display device or an audio output device. The communication device, for example, may be a wireless communication interface or a wired communication interface.

3-4. Operation of an Apparatus in an Energy Saving Process

Figure 12:
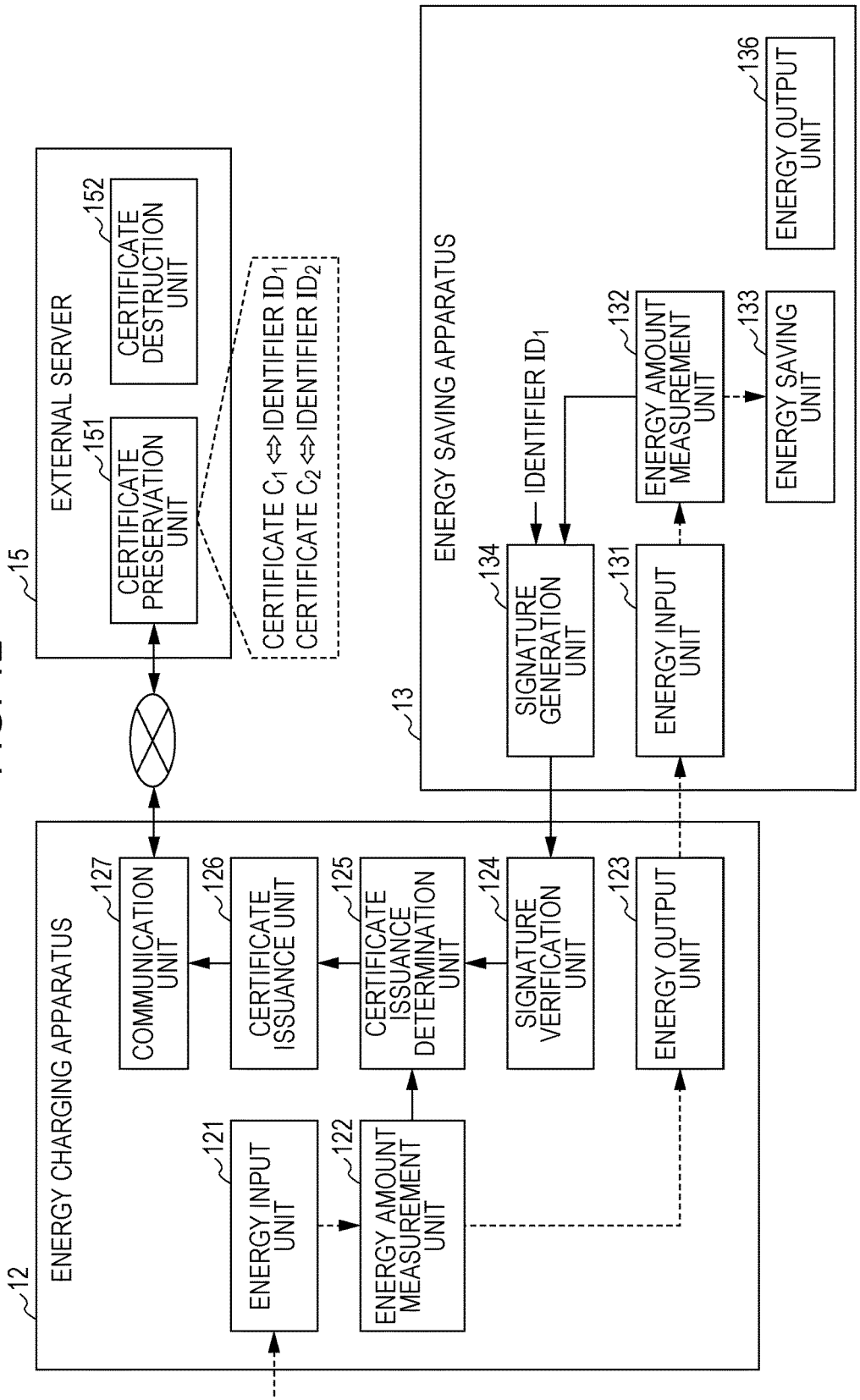
FIG. 12 is a diagram illustrating an energy saving process (second embodiment)
Figure 13:
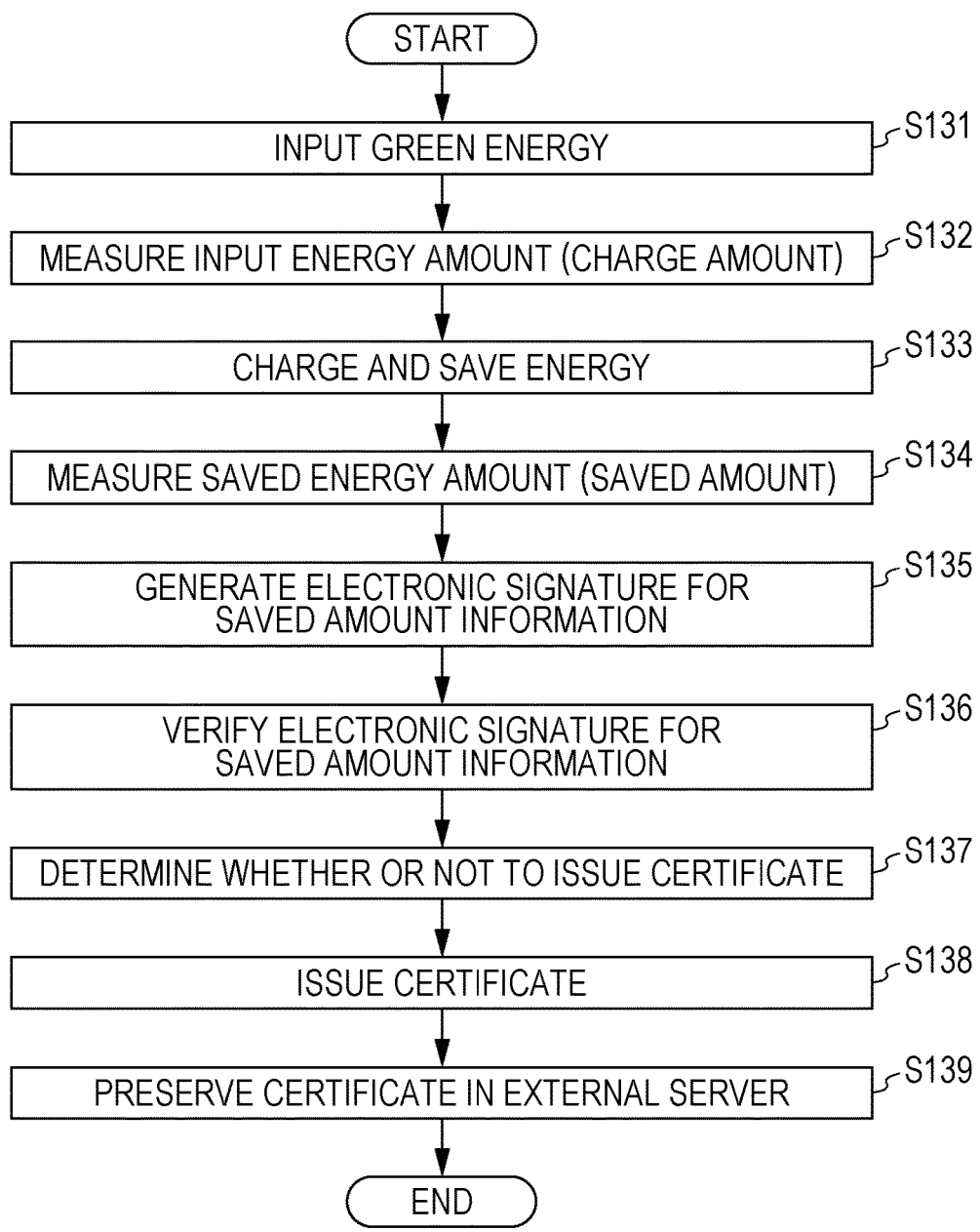
FIG. 13 is a diagram illustrating an energy saving process (second embodiment)

Next, referring to FIGS. 12 and 13, the operation of each apparatus in an energy saving process will be described. FIGS. 12 and 13 are explanatory diagrams illustrating the operation of each apparatus in the energy saving process.

First, referring to FIG. 12, a configuration example of the external server 15 will be briefly described. As shown in FIG. 12, the external server 15 mainly includes a certificate preservation unit 151 and a certificate discard unit 152. The certificate preservation unit 151 is a constituent element that preserves the certificate issued by the energy charging apparatus 12. Further, the certificate discard unit 152 is a constituent element that discards the certificate when green energy stored in the energy saving apparatus 13 is consumed. As described above, the configuration of the external server 15 has been described.

Next, both FIGS. 12 and 13 are referred to. First, the energy that is generated from the green energy generation apparatus 11 is input to the energy input unit 121 of the energy charging apparatus 12 (S131). If the energy is input, the energy charging apparatus 12 measures the amount of energy (charged amount) input to the energy input unit 121 by means of the function of the energy amount measurement unit 122 (S132). The saved amount information is input to the certificate issuance determination unit 125. Further, the energy charging apparatus 12 charges the energy in the energy saving apparatus 13 through the energy output unit 123 (S133).

Further, the energy charged in the energy saving apparatus 13 is saved in the energy saving unit 133 (S133). At this time, the energy saving apparatus 13 measures the amount of energy (saved amount) saved in the energy saving unit 133 by means of the function of the energy amount measurement unit 132 (S134). The saved amount information is input to the signature generation unit 134. Next, the energy saving apparatus 13 generates an electronic signature for the input saved amount information by means of the function of the signature generation unit 134 (S135), and provides the generated electronic signature to the energy charging apparatus 12.

Next, the energy charging apparatus 12 verifies the electronic signature that is acquired from the energy saving apparatus 13 by means of the function of the signature verification unit 124 (S136). If the verification of the electronic signature is successful, the energy charging apparatus 12 determines whether or not to issue the certificate by means of the function of the certificate issuance determination unit 125 (S137). For example, the energy charging apparatus 12 determines whether or not the charged amount coincides with the saved amount within an acceptable error range by means of the function of the certificate issuance determination unit 125. If the charged amount coincides with the saved amount within the acceptable error range, the energy charging apparatus 12 issues a certificate by means of the function of the certificate issuance unit 126 (S138), and provides the certificate to the external server 15.

Next, the external server 15 acquires the certificate issued by the energy charging apparatus 12, and stores the acquired certificate in the certificate preservation unit 151 (S139). If the certificate is stored in the certificate preservation unit 151, a series of energy saving processes is finished. Further, if the verification of the electronic signature fails in step S136, the certificate is not issued. Further, if the charged amount does not coincide with the saved amount within the acceptable error range in step S137, the certificate is not issued.

The operation of each apparatus in the energy saving process has been described. Further, the external server 15 may preserve the certificate of the corresponding energy saving apparatus 13 before starting the energy saving process. In this case, the energy charging apparatus 12 can confirm the amount of green energy saved in the corresponding energy saving apparatus 13 on the basis of the saved amount information included in the certificate. Accordingly, the energy charging apparatus 12 may be configured to issue a certificate for the total amount of green energy saved in the energy saving apparatus 13 after charging the energy.

3-5. Operation of an Apparatus in an Energy Consuming Process

Figure 14:
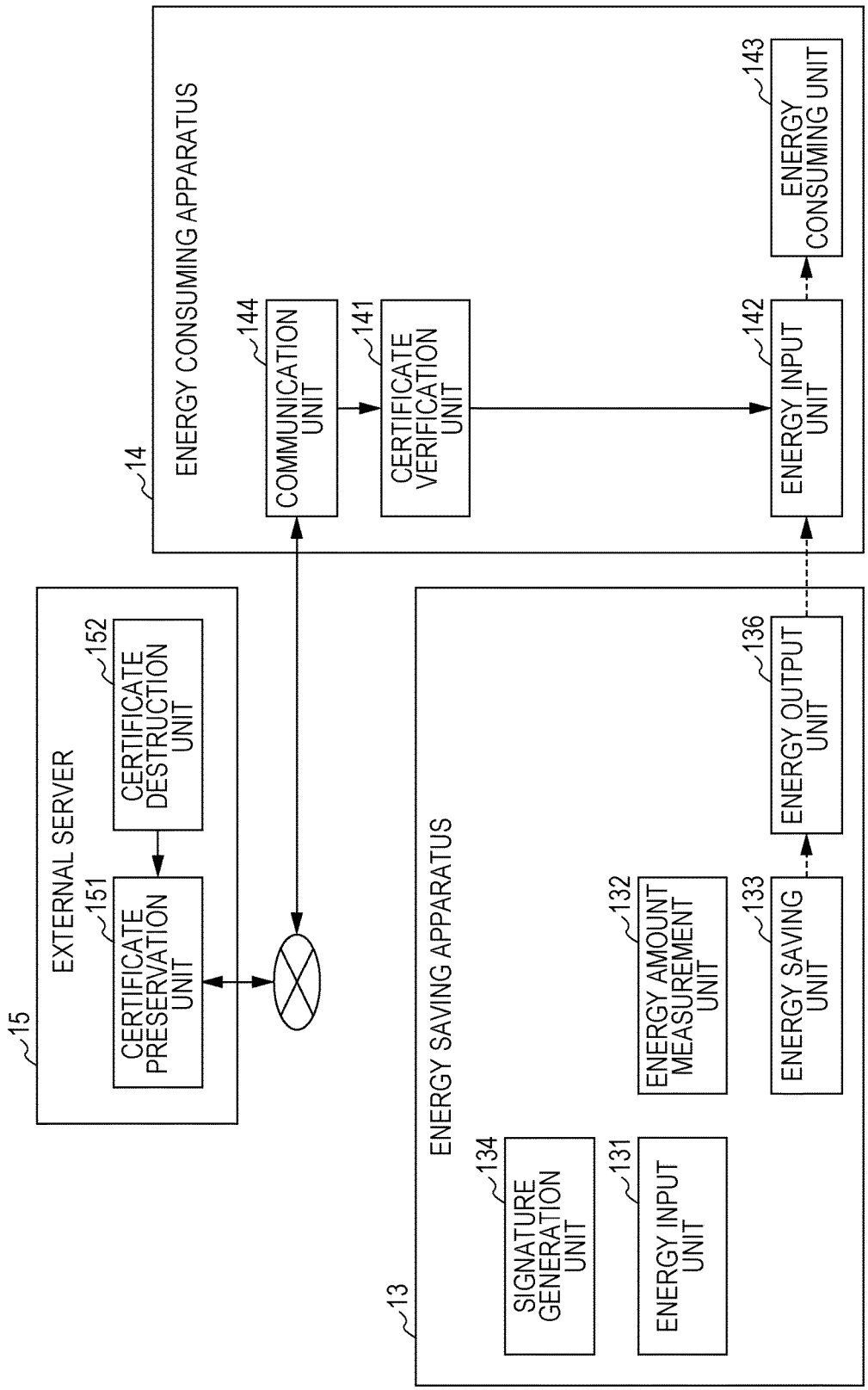
FIG. 14 is a diagram illustrating an energy consuming process (second embodiment)
Figure 15:
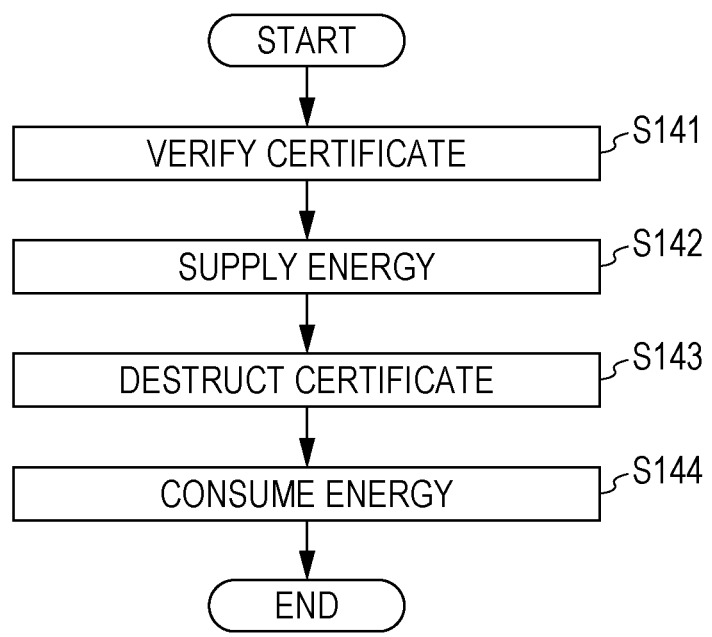
FIG. 15 is a diagram illustrating an energy consuming process (second embodiment)

Next, referring to FIGS. 14 and 15, the operation of each apparatus in the energy consuming process will be described. FIGS. 14 and 15 are explanatory diagrams illustrating the operation of each apparatus in the energy consuming process.

First, a configuration example of the energy consuming apparatus 14 will be briefly described. As shown in FIG. 14, the energy consuming apparatus 14 mainly includes a certificate verification unit 141, an energy input unit 142, an energy consuming unit 143, and a communication unit 144. The certificate verification unit 141 is a constituent element that verifies the validity of the certificate acquired from the external server 15 through the communication unit 144. The energy input unit 142 is an input terminal for inputting the energy. Further, the energy consuming unit 143 is a constituent element that consumes the energy. If the validity of the certificate is confirmed by the certificate verification unit 141, the energy input unit 142 receives an input of the energy. Through this, if the validity of the certificate is not confirmed, the energy is not input to the energy consuming unit 143. As described above, the configuration example of the energy consuming apparatus 14 has been described.

Next, both FIGS. 14 and 15 are referred to. If the energy consuming apparatus 14 and the energy saving apparatus are connected to each other, the energy consuming apparatus 14 acquires the certificate from the external server 15 by means of the function of the communication unit 144. If the certificate is acquired, the energy consuming apparatus 14 verifies the validity of the certificate by means of the function of the certificate verification unit 141 (S141). If the validity of the certificate is confirmed, the energy consuming apparatus 14 starts reception of the energy. Thereafter, the energy supply starts (S142). If the energy supply to the energy consuming apparatus 14 starts, the external server 15 discards the certificate stored in the certificate preservation unit 151 by means of the function of the certificate discard unit 152 (S143).

The energy supplied to the energy consuming apparatus 14 is input to the energy consuming unit 143 through the energy input unit 142. If the energy is input, the energy consuming apparatus 14 consumes the input energy by means of the function of the energy consuming unit 143 (S144). If the energy is consumed by the energy consuming unit 143, a series of energy consuming processes is finished. Further, if the verification of the certificate fails in step S141, the supply of energy to the energy consuming apparatus 14 is not performed. Further, if the energy supply is not performed, the discard of the certificate is also not performed.

As described above, the operation of each apparatus in the energy consuming process has been described. Further, the above description is about the configuration example of the energy consuming apparatus 14 that operates using only the green energy. As shown in the configuration example, using the certificate, a construction that controls energy reception depending on whether or not the supplied energy is green energy can be realized. Further, through modification of this construction, it is also possible to realize a construction that limits the function of the energy consuming apparatus 14 if the supplied energy is non-green energy, rather than completely denying the acceptance of the non-green energy.

As described above, the second embodiment of the present disclosure has been described. If the technology according to this embodiment is used, it can be confirmed whether or not the energy that is supplied from the energy saving apparatus 13 is green energy using the certificate. Through this, it becomes possible to realize a device that operates with green energy or a device having an improved function through the use of green energy.

4. Third Embodiment (Configuration in which a Consuming Apparatus Issues and Stores a Certificate in a Saving Apparatus)

Next, a third embodiment of the present disclosure will be described. In the first and second embodiments as described above, update of the certificate is not considered. For example, in the case where green energy, of which the amount is smaller than the saved amount that the certificate certifies, is consumed, the construction according to the first and second embodiments discards the certificate, but does not issue a certificate that certifies the residual amount of green energy. This embodiment relates to a construction that issues a certificate that certifies the residual amount of green energy in the energy consuming process.

4-1. Configuration Example of an Energy Consuming Apparatus 14

Figure 16:
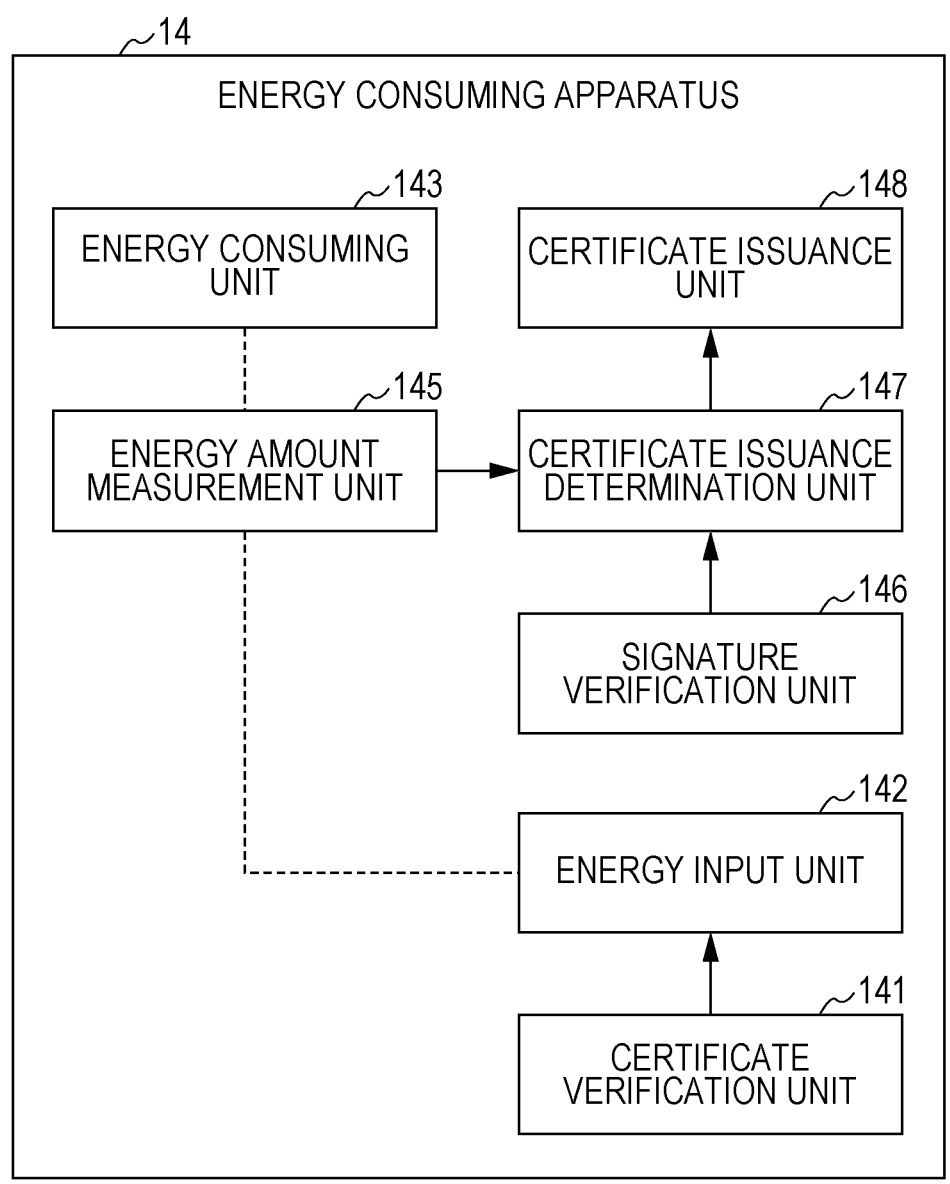
FIG. 16 is a diagram illustrating a configuration example (third embodiment) of an energy consuming apparatus.

First, referring to FIG. 16, a configuration example of the energy consuming apparatus 14 according to this embodiment will be described. FIG. 16 is a diagram illustrating a configuration example of the energy consuming apparatus 14 according to this embodiment.

As shown in FIG. 16, the energy consuming apparatus 14 mainly includes a certificate verification unit 141, an energy input unit 142, an energy consuming unit 143, an energy amount measurement unit 145, a signature verification unit 146, a certificate issuance determination unit 147, and a certificate issuance unit 148.

The energy verification unit 141 is a constituent element that verifies the certificate. If the validity of the certificate is confirmed, the energy input unit 142 receives the energy from the energy saving apparatus 13. The energy input unit 142 is connected to the energy amount measurement unit 145. Through this, the energy input to the energy input unit 142 is input to the energy amount measurement unit 145. If the energy is input, the energy amount measurement unit 145 measures the amount of the input energy (hereinafter, consumed amount). Further, the energy amount measurement unit 145 inputs consumed amount information to the certificate issuance determination unit 147.

Further, the energy amount measurement unit 145 is connected to the energy consuming unit 143. Through this, the energy input to the energy amount measurement unit 145 is input to the energy consuming unit 143. If the energy is input, the energy consuming unit 143 consumes the input energy.

The signature verification unit 146 is a constituent element that verifies an electronic signature. For example, when an electronic signature is acquired from the energy saving apparatus 13, the signature verification unit 146 verifies the electronic signature using a public key of the energy saving apparatus 13. As described hereinafter, the energy saving apparatus 13 measures an amount of energy (hereinafter, supplied amount) that is supplied from the energy consuming apparatus 14, and provides supplied amount information with an electronic signature attached thereto to the energy consuming apparatus 14. Accordingly, the signature verification unit 146 verifies that the provided supplied amount information is information that is indeed provided from the energy saving apparatus 13.

The result of the verification through the signature verification unit 146 is input to the certificate issuance determination unit 147. At this time, the signature verification unit 146 inputs information on the supplied amount that is measured by the energy saving apparatus 13 to the certificate issuance determination unit 147. That is, to the certificate issuance determination unit 147, consumed amount information and the supplied amount information are input.

If the consumed amount information and the supplied amount information are input, the certificate issuance determination unit 147 compares the consumed amount with the supplied amount on the basis of the input information. If the consumed amount coincides with the supplied amount within an acceptable error range, the certificate issuance determination unit 147 permits the issuance of a certificate. On the other hand, if the consumed amount does not coincide with the supplied amount within the acceptable error range, the certificate issuance determination unit 147 does not permit the issuance of the certificate. In the case of permitting the issuance of the certificate, the certificate issuance determination unit 147 notifies the certificate issuance unit 148 of the permission of the issuance of the certificate.

If the permission of the issuance of the certificate is notified, the certificate issuance unit 148 subtracts the supplied amount from the saved amount of green energy that is certified by the certificate acquired from the energy saving apparatus 13, and calculates the residual saved amount of green energy that is saved in the energy saving apparatus 13. Then, the certificate issuance unit 148 issues a certificate that certifies the residual saved amount of green energy saved in the energy saving apparatus 13. The certificate issued by the certificate issuance unit 148 is provided to the energy saving apparatus 13. Further, the certificate includes the saved amount information and identification information for identifying the energy saving apparatus 13.

As described above, the configuration example of the energy consuming apparatus 14 according to this embodiment has been described. Further, in addition to the constituent elements illustrated in FIG. 16, the energy consuming apparatus 14 may include an input device, an output device, and a communication device mounted thereon. The input device, for example, may be a touch sensor or a button. Further, the output device, for example, may be a display device or an audio output device. The communication device, for example, may be a wireless communication interface or a wired communication interface.

4-2. Configuration Example of an Energy Saving Apparatus 13

Figure 17:
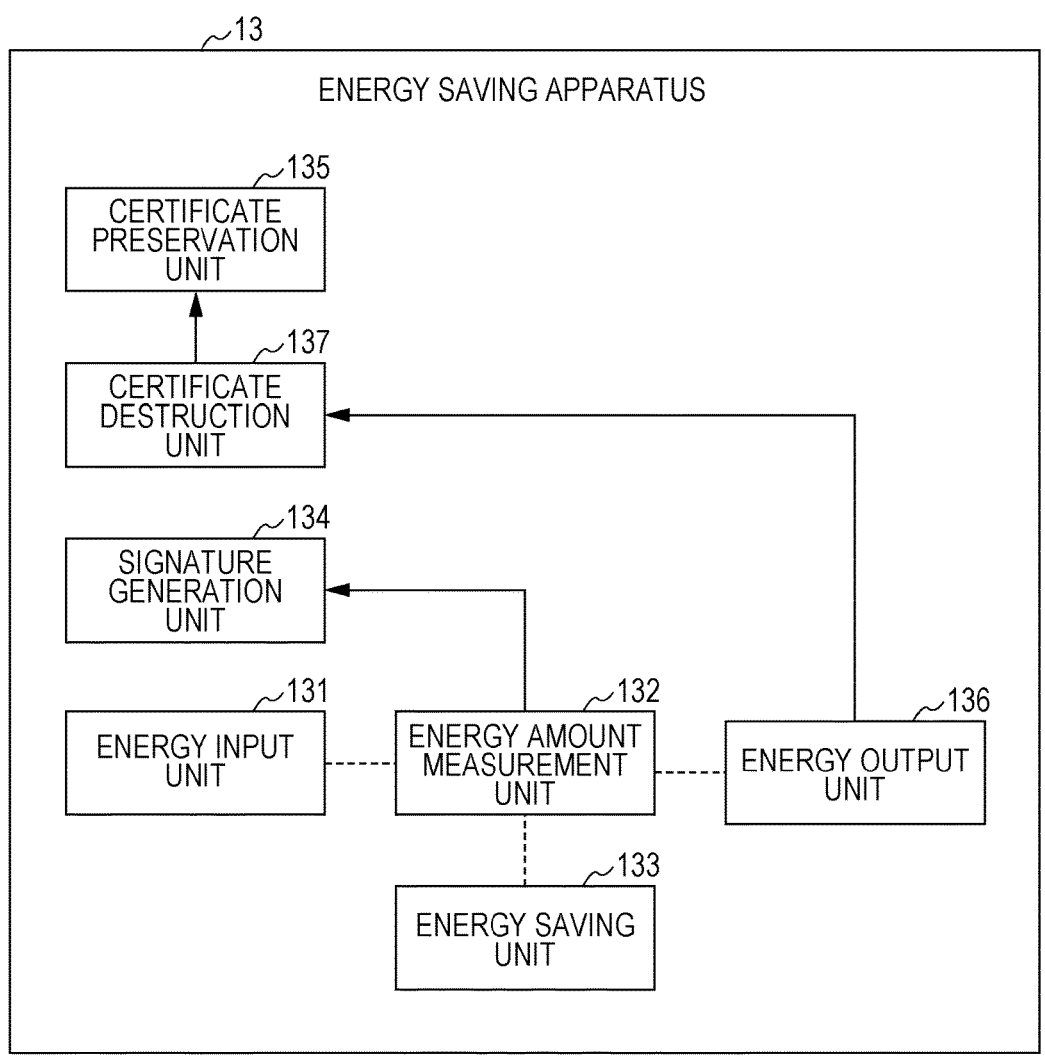
FIG. 17 is a diagram illustrating a configuration example (third embodiment) of an energy saving apparatus.

Next, referring to FIG. 17, a configuration example of the energy saving apparatus 13 according to this embodiment will be described. FIG. 17 is a diagram illustrating a configuration example of the energy saving apparatus 13 according to this embodiment.

As shown in FIG. 17, the energy saving apparatus 13 mainly includes an energy input unit 131, an energy amount measurement unit 132, an energy saving unit 133, a signature generation unit 134, a certificate preservation unit 135, an energy output unit 136, and a certificate discard unit 137.

The energy input unit 131 is an input terminal for inputting energy from the energy charging apparatus 12. The energy input unit 131 is connected to the energy amount measurement unit 132. Through this, the energy input to the energy input unit 131 is input to the energy amount measurement unit 132. If the energy is input, the energy amount measurement unit 132 measures the amount of the input energy (saved amount). Further, the energy amount measurement unit 132 inputs the saved amount information to the signature generation unit 134.

Further, the energy amount measurement unit 132 is connected to the energy saving unit 133. Through this, the energy input to the energy amount measurement unit 132 is input to the energy saving unit 133. If the energy is input, the energy saving unit 133 saves the energy. Further, the energy saving unit 133 is connected to the energy output unit 136. Through this, the energy saving unit 133 can input the saved energy to the energy output unit 136. Further, the energy output unit 136 is an output terminal for outputting the energy toward the energy consuming apparatus 14.

If saved amount information is input from the energy amount measurement unit 132, the signature generation unit 134 generates an electronic signature for the input saved amount information. For example, the signature generation unit 134 generates the electronic signature using a secret key that constitutes a pair together with the public key of the energy saving apparatus 13. Further, the signature generation unit 134 gives the generated electronic signature to the saved amount information and provides the saved amount information with the electronic signature to the energy charging apparatus 12.

As described above, if the verification of the electronic signature is successful, the energy charging apparatus 12, which has acquired the saved amount information with the electronic signature, issues a certificate that certifies that the energy saved in the energy saving apparatus 13 is green energy. Further, energy charging apparatus 12 provides the issued certificate to the energy saving apparatus 13. If the certificate issued by the energy charging apparatus 12 is acquired, the energy saving apparatus 13 stores the acquired certificate in the certificate preservation unit 135. The certificate preservation unit 135 preserves the stored certificate.

If the energy consuming apparatus 14 is connected to the energy output unit 136, the energy saved in the energy saving unit 133 is input to the energy saving apparatus 14 through the energy output unit 136. At this time, the energy output unit 136 notifies the certificate discard unit 137 that the energy saved in the energy saving unit 133 is input to the energy consuming apparatus 14. The certificate discard unit 137 that has received this notification discards the certificate stored in the certificate preservation unit 135. Further, the verification process can be simplified through discarding of the certificate according to the output of the energy.

Further, when the energy is input from the energy saving unit 133 to the energy output unit 136, the energy amount measurement unit 132 measures the amount of energy (supplied amount) input to the energy output unit 136. Further, the energy amount measurement unit 132 inputs the supplied amount information to the signature generation unit 134. If the supplied amount information is input from the energy amount measurement unit 132, the signature generation unit 134 generates an electronic signature for the input supplied amount information. For example, the signature generation unit 134 generates the electronic signature using a secret key that constitutes a pair together with the public key of the energy saving apparatus 13. Further, the signature generation unit 134 gives the generated electronic signature to the supplied amount information and provides the supplied amount information with the electronic signature to the energy consuming apparatus 14.

As described, the configuration example of the energy saving apparatus 13 according to this embodiment has been described. Further, in addition to the constituent elements illustrated in FIG. 17, the energy saving apparatus 13 may include an input device, an output device, and a communication device mounted thereon. The input device, for example, may be a touch sensor or a button. Further, the output device, for example, may be a display device or an audio output device. The communication device, for example, may be a wireless communication interface or a wired communication interface.

4-3. Operation of an Apparatus in an Energy Consuming Process

Figure 18:
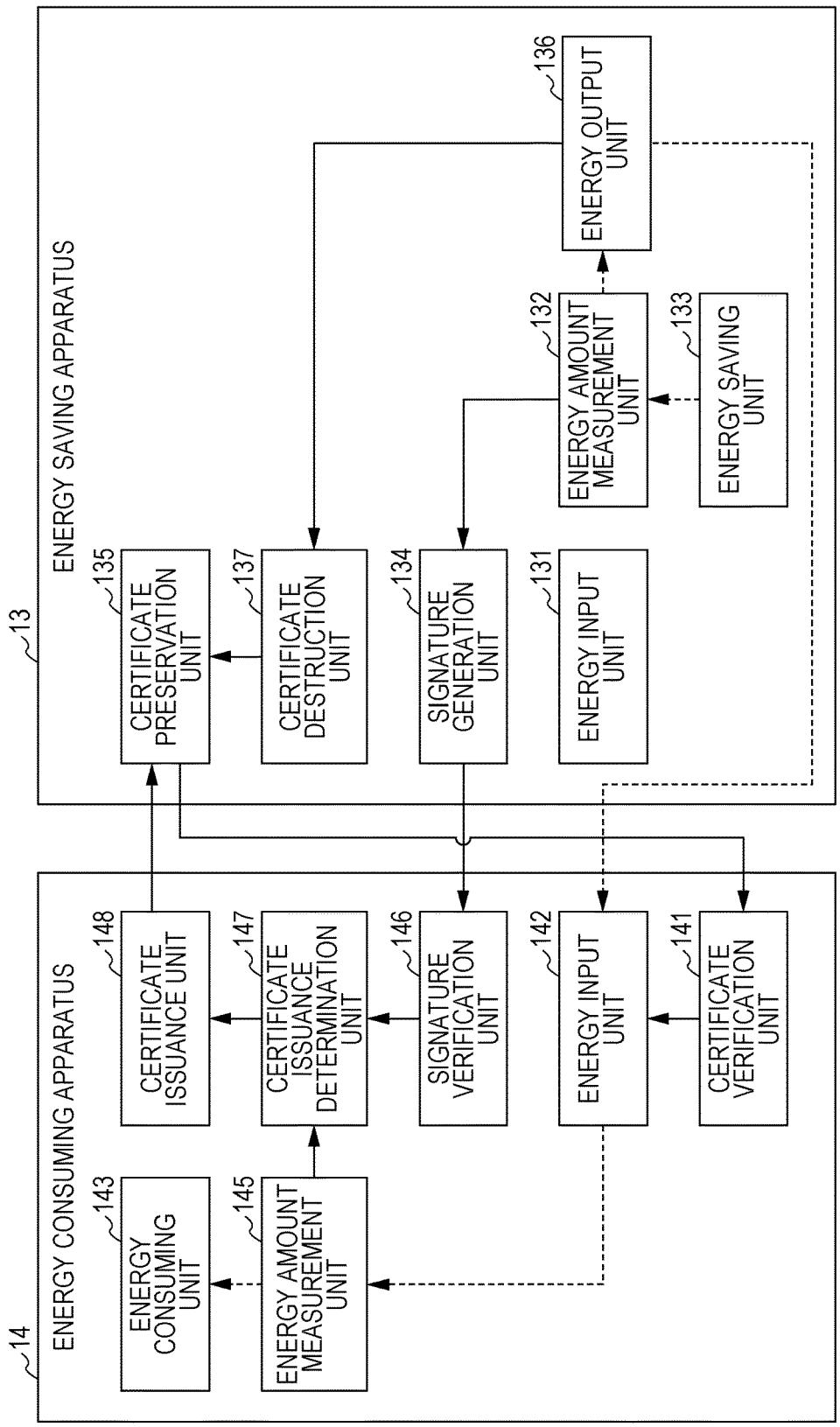
FIG. 18 is a diagram illustrating an energy consuming process (third embodiment)
Figure 19:
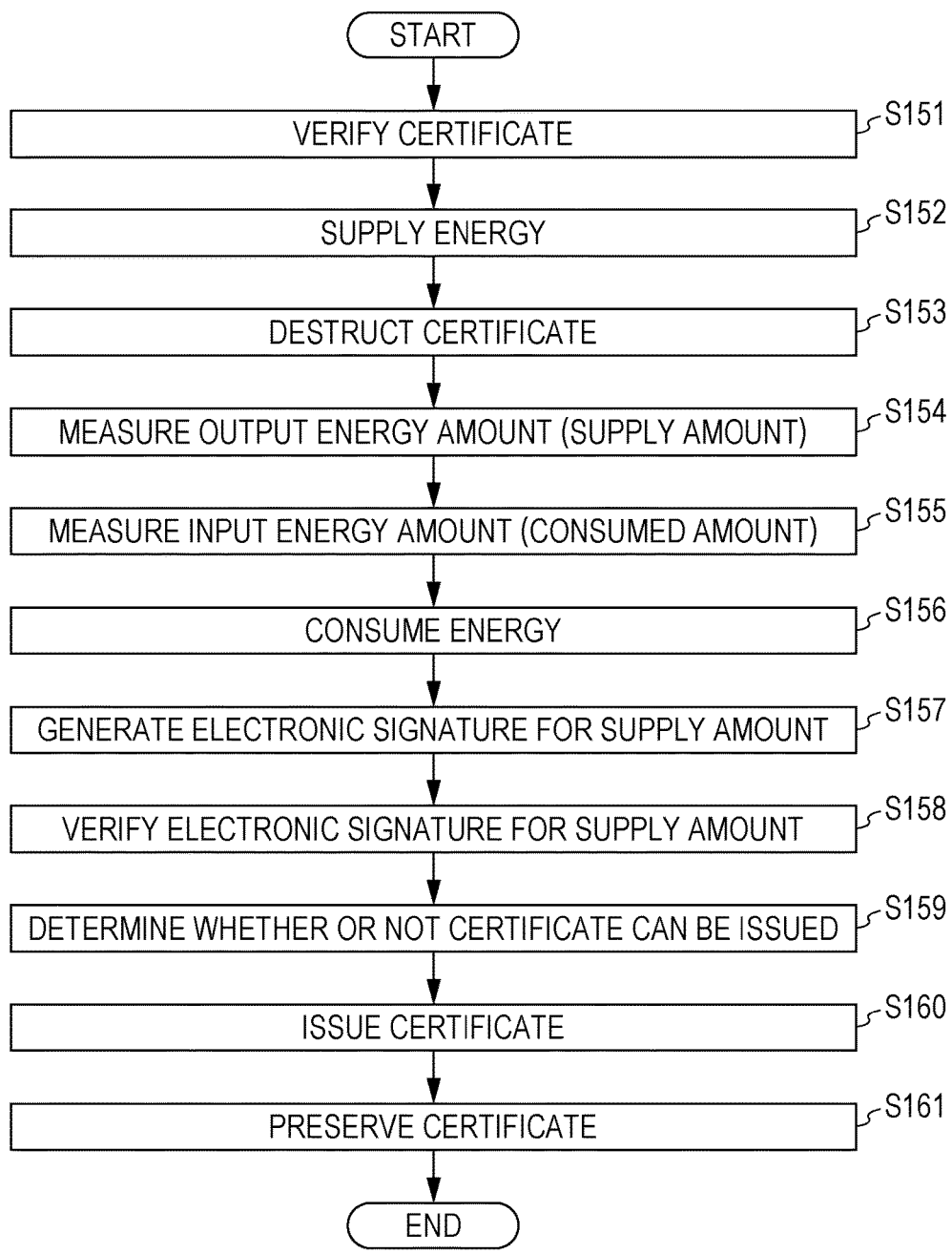
FIG. 19 is a diagram illustrating an energy consuming process (third embodiment)

Next, referring to FIGS. 18 and 19, the operation of each apparatus in an energy consuming process will be described. FIGS. 18 and 19 are explanatory diagrams illustrating the operation of each apparatus in the energy consuming process.

If the energy consuming apparatus 14 and the energy saving apparatus 13 are connected to each other, the certificate is provided from the energy saving apparatus 13 to the energy consuming apparatus 14. If the certificate is provided, the energy consuming apparatus 14 verifies the validity of the certificate by means of the function of the certificate verification unit 141 (S151). If the validity of the certificate is confirmed, the energy consuming apparatus 14 starts the reception of the energy (S152). If the energy supply to the energy consuming apparatus 14 starts, the energy saving apparatus 13 discards the certificate that is stored in the certificate preservation unit 135 by means of the function of the certificate discard unit 137 (S153).

Further, the energy saving apparatus 13 measures the amount of energy (supplied amount) that is supplied to the energy consuming apparatus 14 through the energy output unit 136 by means of the function of the energy amount measurement unit 132 (S154). On the other hand, the energy consuming apparatus 14 measures the amount of energy (consumed amount) that is supplied from the energy saving apparatus 13 through the energy input unit 142 (S155). Next, the energy consuming apparatus 14 consumes the energy supplied from the energy saving apparatus 13 by means of the function of the energy consuming unit 143 (S156).

Further, the energy saving apparatus 13 generates an electronic signature for the supplied amount information by means of the function of the signature generation unit 134 (S157), gives the generated electronic signature to the supplied amount information, and provides the supplied amount information with the electronic signature to the energy consuming apparatus 14. The energy consuming apparatus 14 verifies the electronic signature for the supplied amount information acquired from the energy saving apparatus by means of the function of the signature verification unit 146 (S158). If the verification of the electronic signature is successful, the energy consuming apparatus 14 determines whether or not to issue the certificate by means of the function of the certificate issuance determination unit 147 (S159). At this time, the energy consuming apparatus 14 permits the issuance of the certificate by means of the function of the certificate issuance determination unit 147 in the case where the supplied amount and the consumed amount coincide with each other within the acceptable error range.

If the issuance of the certificate is permitted, the energy consuming apparatus 14 issues the certificate by means of the function of the certificate issuance unit 148 (S160). At this time, the energy consuming apparatus 14 calculates the residual saved amount of green energy that is obtained by subtracting the supplied amount from the saved amount of green energy, and issues the certificate that certifies the calculated residual saved amount by means of the function of the certificate issuance unit 148. This certificate is provided to the energy saving apparatus 13. If the certificate that certifies the residual saved amount of green energy is acquired, the energy saving apparatus 13 stores the acquired certificate in the certificate preservation unit 135 (S161).

If the certificate that certifies the residual saved amount of green energy is stored in the certificate preservation unit 135, a series of energy consuming processes is finished. Further, if the verification of the certificate fails in step S151, the supply of the energy to the energy consuming apparatus 14 is not performed. Further, if the supply of the energy is not performed, the discard of the certificate is not performed. Further, if the verification of the electronic signature fails in step S158, the certificate that certifies the residual saved amount is not issued. Further, if the supplied amount and the consumed amount do not coincide with each other in step S159, the certificate that certifies the residual saved amount is not issued.

As described above, the operation of each apparatus in the energy consuming process has been described. Using the above-described construction, the certificate is appropriately updated according to the residual amount of green energy.

Further, the above description is about the configuration example of the energy consuming apparatus 14 that operates using only the green energy. As shown in the configuration example, using the certificate, a construction that controls energy reception depending on whether or not the supplied energy is green energy can be realized. Further, through modification of this construction, it is also possible to realize a construction that limits the function of the energy consuming apparatus 14 if the supplied energy is non-green energy, rather than completely denying the acceptance of the non-green energy.

As described above, the third embodiment of the present disclosure has been described. If the technology according to this embodiment is used, it can be confirmed whether or not the energy that is supplied from the energy saving apparatus 13 is green energy using the certificate. Through this, it becomes possible to realize a device that operates with green energy or a device having an improved function through the use of green energy. Further, it becomes possible to perform the residual amount management of green energy.

5. Fourth Embodiment (Configuration in Which a Consuming Apparatus Issues and Stores a Certificate in a Cloud)

Next, a fourth embodiment of the present disclosure will be described. This embodiment relates to a configuration that preserves the certificate issued by the energy charging apparatus 12 in the energy saving process and the certificate issued by the energy consuming apparatus 14 in the energy consuming process in an external server 15 (for example, a cloud system or the like) in association with the energy saving apparatus 13.

5-1. Configuration and Operation of an Apparatus in an Energy Consuming Process

Figure 20:
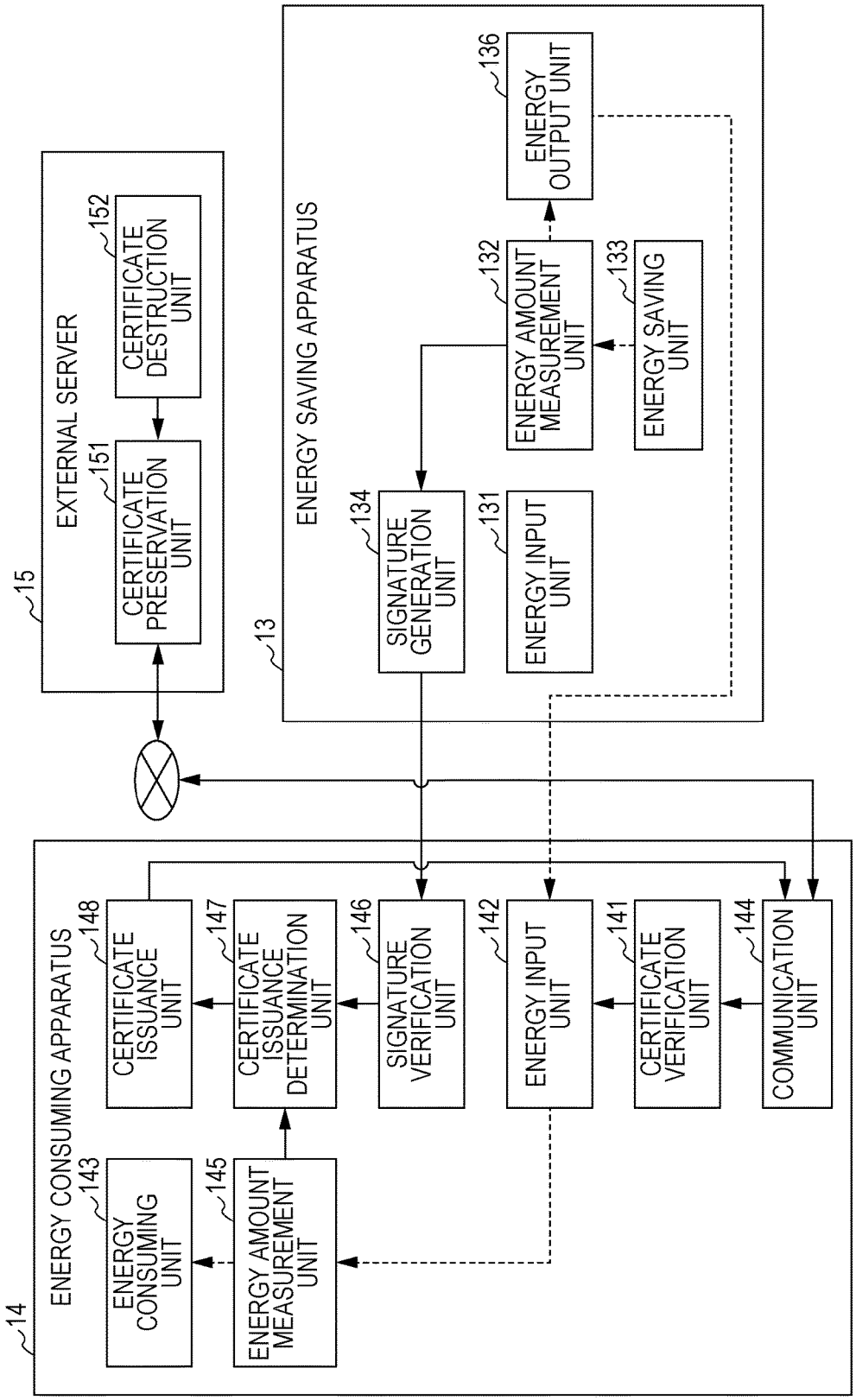
FIG. 20 is a diagram illustrating an energy consuming process (fourth embodiment)
Figure 21:
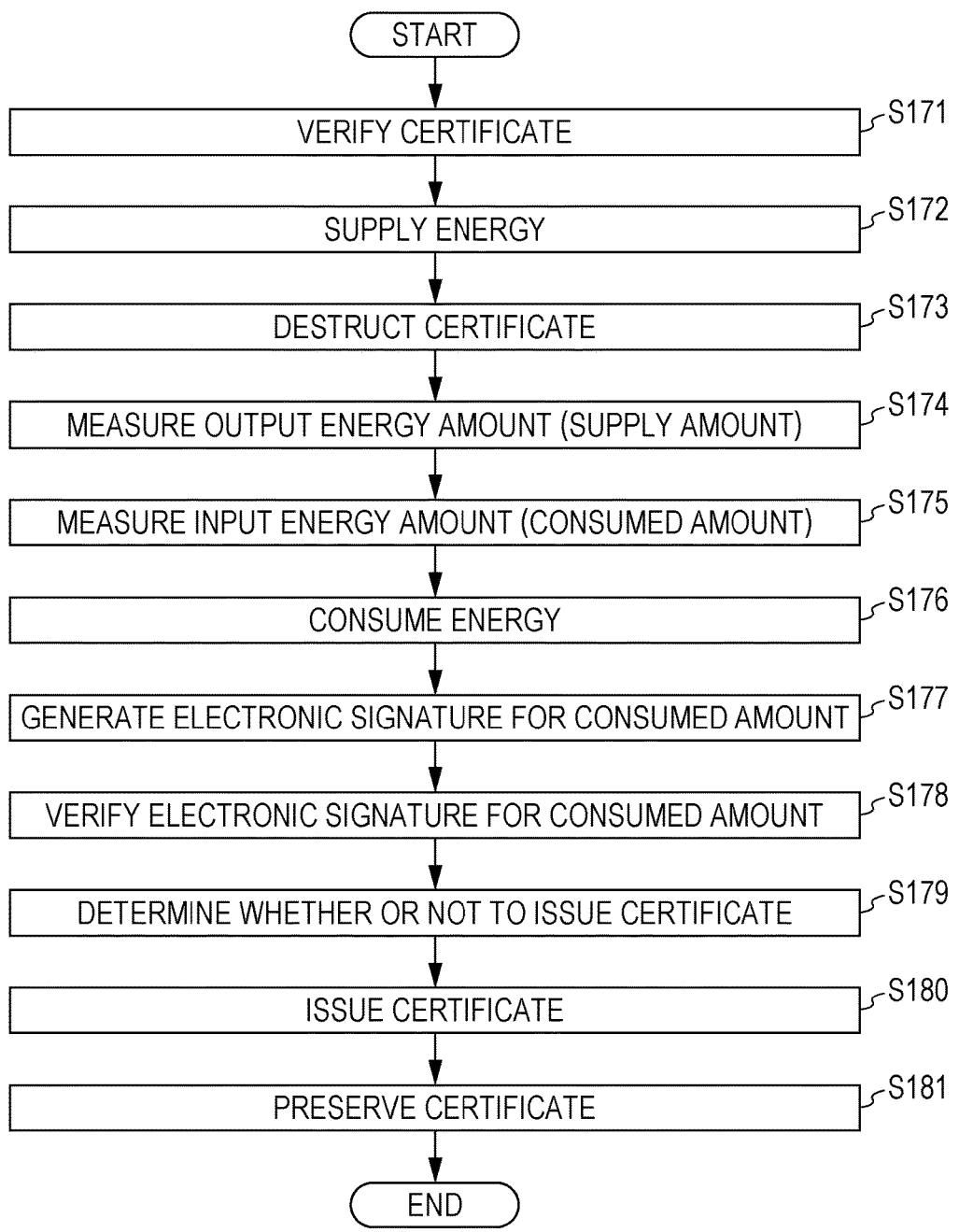
FIG. 21 is a diagram illustrating an energy consuming process (fourth embodiment)

Referring to FIGS. 20 and 21, the operation of each apparatus in an energy consuming process will be described. FIGS. 20 and 21 are explanatory diagrams illustrating the operation of each apparatus in the energy consuming process.

If the energy consuming apparatus 14 and the energy saving apparatus 13 are connected to each other, the certificate is provided from the external server 15 to the energy consuming apparatus 14. If the certificate is provided, the energy consuming apparatus 14 verifies the validity of the certificate by means of the function of the certificate verification unit 141 (S171). If the validity of the certificate is confirmed, the energy consuming apparatus 14 starts the reception of the energy (S172). If the energy supply to the energy consuming apparatus 14 starts, the external server 15 discards the certificate that is stored in the certificate preservation unit 151 by means of the function of the certificate discard unit 152 (S173).

Further, the energy saving apparatus 13 measures the amount of energy (supplied amount) that is supplied to the energy consuming apparatus 14 through the energy output unit 136 by means of the function of the energy amount measurement unit 132 (S174). On the other hand, the energy consuming apparatus 14 measures the amount of energy (consumed amount) that is supplied from the energy saving apparatus 13 through the energy input unit 142 (S175) by means of the function of the energy amount determination unit 145. Next, the energy consuming apparatus 14 consumes the energy supplied from the energy saving apparatus 13 by means of the function of the energy consuming unit 143 (S176).

Further, the energy saving apparatus 13 generates an electronic signature for the supplied amount information by means of the function of the signature generation unit 134 (S177), gives the generated electronic signature to the supplied amount information, and provides the supplied amount information with the electronic signature to the energy consuming apparatus 14. the energy consuming apparatus 14 verifies the electronic signature for the supplied amount information acquired from the energy saving apparatus 13 by means of the function of the signature verification unit 146 (S178). If the verification of the electronic signature is successful, the energy consuming apparatus 14 determines whether or not to issue the certificate by means of the function of the certificate issuance determination unit 147 (S179). At this time, the energy consuming apparatus 14 permits the issuance of the certificate by means of the function of the certificate issuance determination unit 147 in the case where the supplied amount and the consumed amount coincide with each other within the acceptable error range.

If the issuance of the certificate is permitted, the energy consuming apparatus 14 issues the certificate by means of the function of the certificate issuance unit 148 (S180). At this time, the energy consuming apparatus 14 calculates the residual saved amount of green energy that is obtained by subtracting the supplied amount from the saved amount of green energy, and issues the certificate that certifies the calculated residual saved amount by means of the function of the certificate issuance unit 148. This certificate is provided to the external server 15 through the communication unit 144. If the certificate that certifies the residual saved amount of green energy is acquired, the external server 15 stores the acquired certificate in the certificate preservation unit 151 (S181).

If the certificate that certifies the residual saved amount of green energy is stored in the certificate preservation unit 151, a series of energy consuming processes is finished. Further, if the verification of the certificate fails in step S171, the supply of the energy to the energy consuming apparatus 14 is not performed. Further, if the supply of the energy is not performed, the discard of the certificate is not performed. Further, if the verification of the electronic signature fails in step S178, the certificate that certifies the residual saved amount is not issued. Further, if the supplied amount and the consumed amount do not coincide with each other in step S179, the certificate that certifies the residual saved amount is not issued.

As described above, the operation of each apparatus in the energy consuming process has been described. Using the above-described construction, the certificate is appropriately updated according to the residual amount of green energy.

Further, the above description is about the configuration example of the energy consuming apparatus 14 that operates using only the green energy. As shown in the configuration example, using eh certificate, a construction that controls energy reception depending on whether or not the supplied energy is green energy can be realized. Further, through modification of this construction, it is also possible to realize a construction that limits the function of the energy consuming apparatus 14 if the supplied energy is non-green energy, rather than completely denying the acceptance of the non-green energy.

As described above, the fourth embodiment of the present disclosure has been described. If the technology according to this embodiment is used, it can be confirmed whether or not the energy that is supplied from the energy saving apparatus 13 is green energy using the certificate. Through this, it becomes possible to realize a device that operates with green energy or a device having an improved function through the use of green energy. Further, it becomes possible to perform the residual amount management of green energy.

6. Usage Example of a Certificate

Next, application examples (usage examples of a certificate) using a structure according to the first to fourth embodiment may be considered. This construction may be used to make a system in which energy consumers want to use green energy actively and continuously.

6-1. Usage Example #1 (Functional Limitations)

Figure 22:
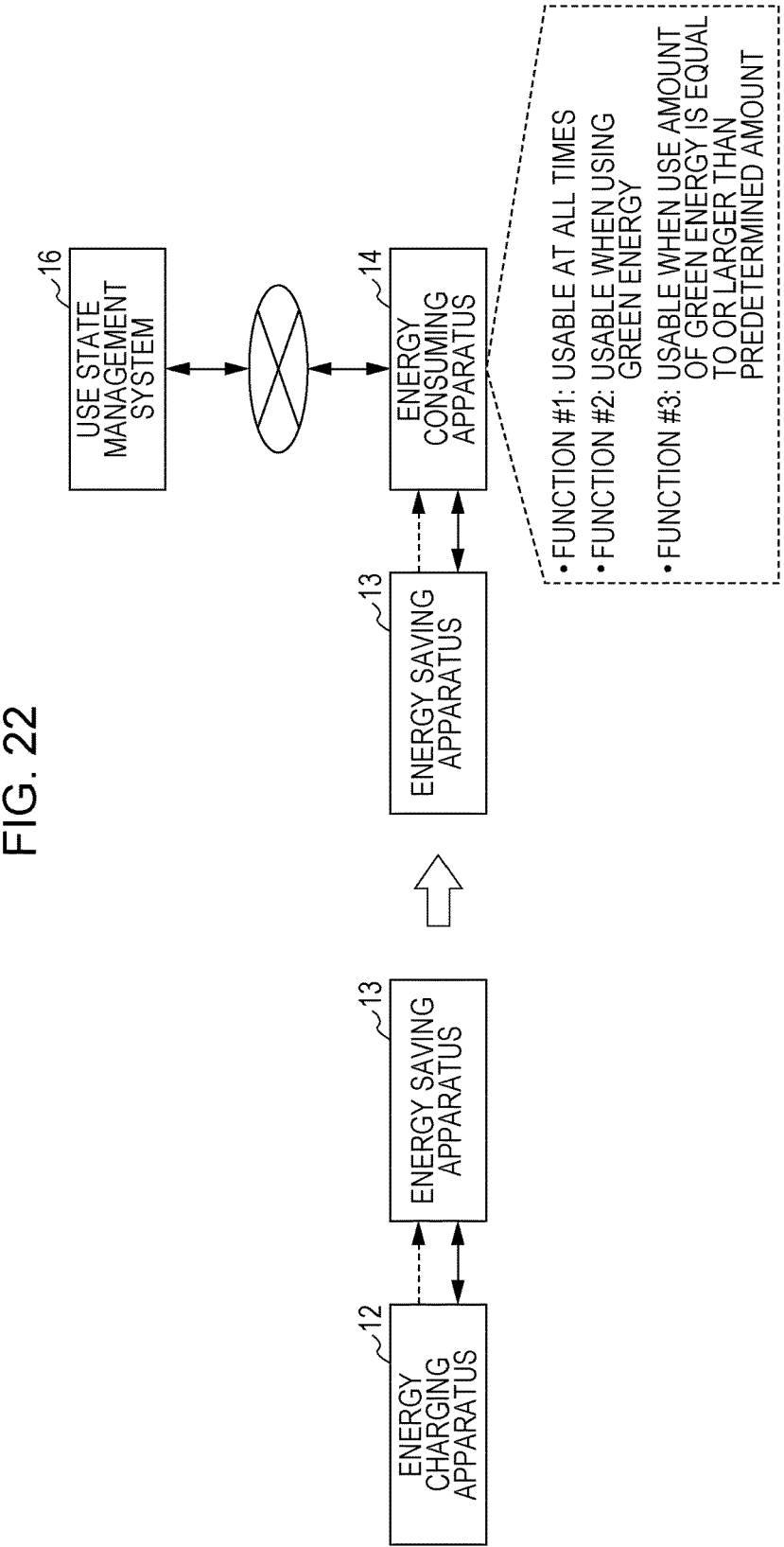
FIG. 22 is a diagram illustrating a usage example (use example #1) of a certificate.

For example, a system illustrated in FIG. 22 is considered.

As shown in FIG. 22, this system includes an energy charging apparatus 12, an energy saving apparatus 13, an energy consuming apparatus 14, and a use state management system 16. Further, the use state management system 16 is a system that manages the use state of green energy saved in the energy saving apparatus 13. For example, the use state management system 16 manages the amount of green energy consumed by the energy consuming apparatus 14.

As described above, the energy consuming apparatus 14 can determine whether or not the energy supplied from the energy saving apparatus 13 is green energy using the certificate. Through this, the energy consuming apparatus 14 may limit usable functions depending on whether or not green energy is used or depending on the used amount of green energy.

For example, as shown in FIG. 22, a function (function #1) that is usable without depending on the type of energy, and a function (function #2) that is usable when green energy is used may be set. Further, through management of the consumed amount of green energy in association with the energy consuming apparatus 14 when the green energy is consumed, a function (function #3) that is usable when the total used amount of green energy is equal to or larger than a predetermined value may be set.

If it is set that usable functions are increased in the energy consuming apparatus 14 through the use of the green energy, a consumer may actively use the green energy. Further, if it is set that functions are increased depending on the used amount of green energy, the consumer may continuously use the green energy. For example, if a character of the game is grown or the type of game play is increased according to the increase of the used amount of green energy, it is considered that the consumer uses green energy actively and continuously.

Further, if the kind of downloadable applications is increased or music data or video data can be downloaded according to the increase of the used amount of green energy, it is considered that the consumer uses green energy actively and continuously. Further, if points are given according to the total used amount of green energy or the price of a good or a service is discounted according to the given point, it is considered that the consumer uses green energy actively and continuously.

6-2. Usage Example #2 (Payoff to a User)

Figure 23:
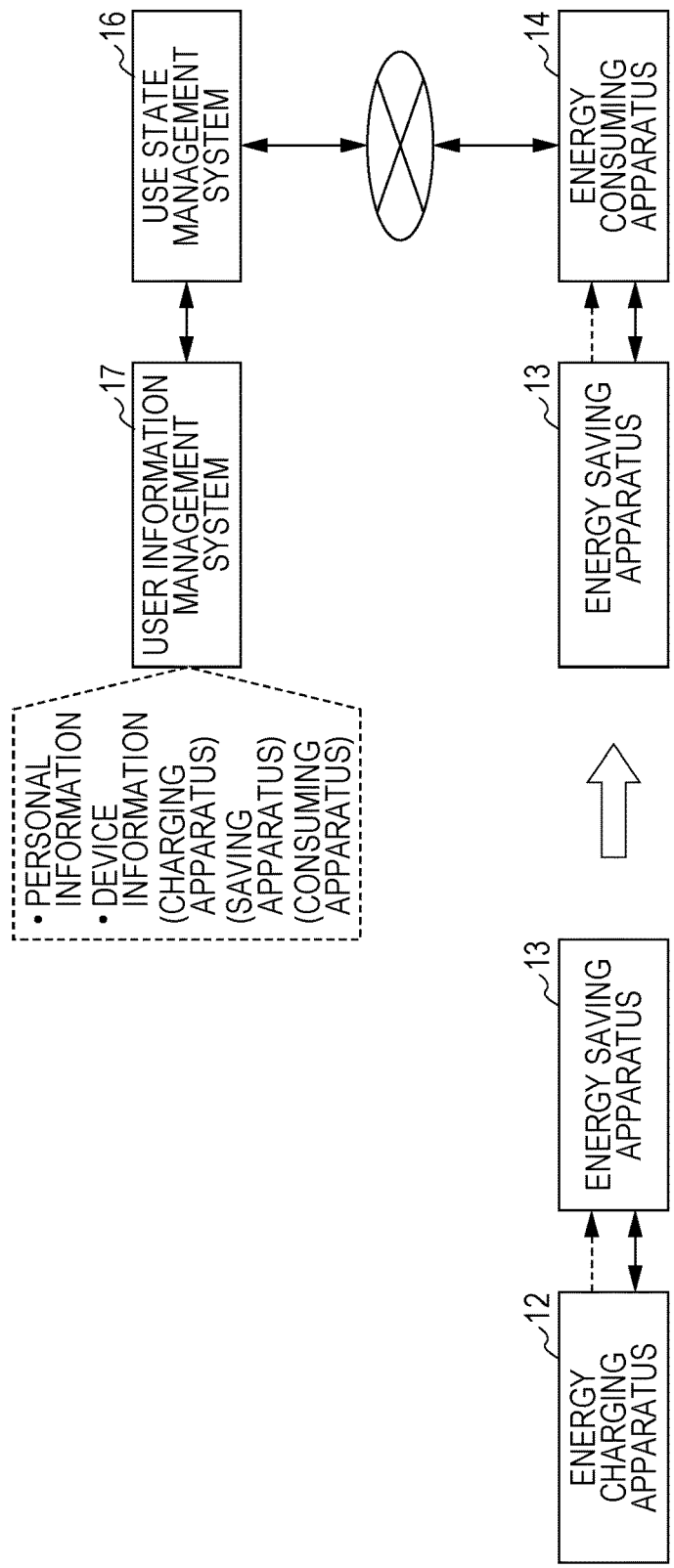
FIG. 23 is a diagram illustrating a usage example (use example #2) of a certificate.

Further, a system configuration (usage example #2) illustrated in FIG. 23 may be considered.

As shown in FIG. 23, this system includes an energy charging apparatus 12, an energy saving apparatus 13, an energy consuming apparatus 14, a use state management system 16, and a user information management system 17. In the case of usage example #1, the use state of green energy is managed in the unit of the energy consuming apparatus 14. Usage example #2 relates to a construction that manages the use state of green energy in the unit of a user. By managing the use state of green energy in the unit of a user, it becomes possible to encourage the use of green energy for each user.

For example, the user information management system 17 manages the user personal information and device information in association with each other. Here, the device information is information for identifying the energy charging apparatus 12, the energy saving apparatus 13, and the energy consuming apparatus 14. For example, if a user A consumes green energy using the energy consuming apparatus 14, the energy consuming apparatus 14 provides device information of the energy consuming apparatus 14, device information of the energy saving apparatus 13, and consumed amount information with respect to the use state management system 16.

The use state management system 16 provides device information acquired from the energy consuming apparatus 14 to the user information management system 17, and acquires personal information of user A that corresponds to the device information. If the personal information is acquired, the use state management system 16 provides benefits to user A according to the consumed amount in association with the acquired personal information of user A and consumed amount information. For example, the use state management system 16 may give points to user A or may discount the purchase price when user A purchases a good or a service.

6-3. Usage Example #3 (Provision of Service)

Figure 24:
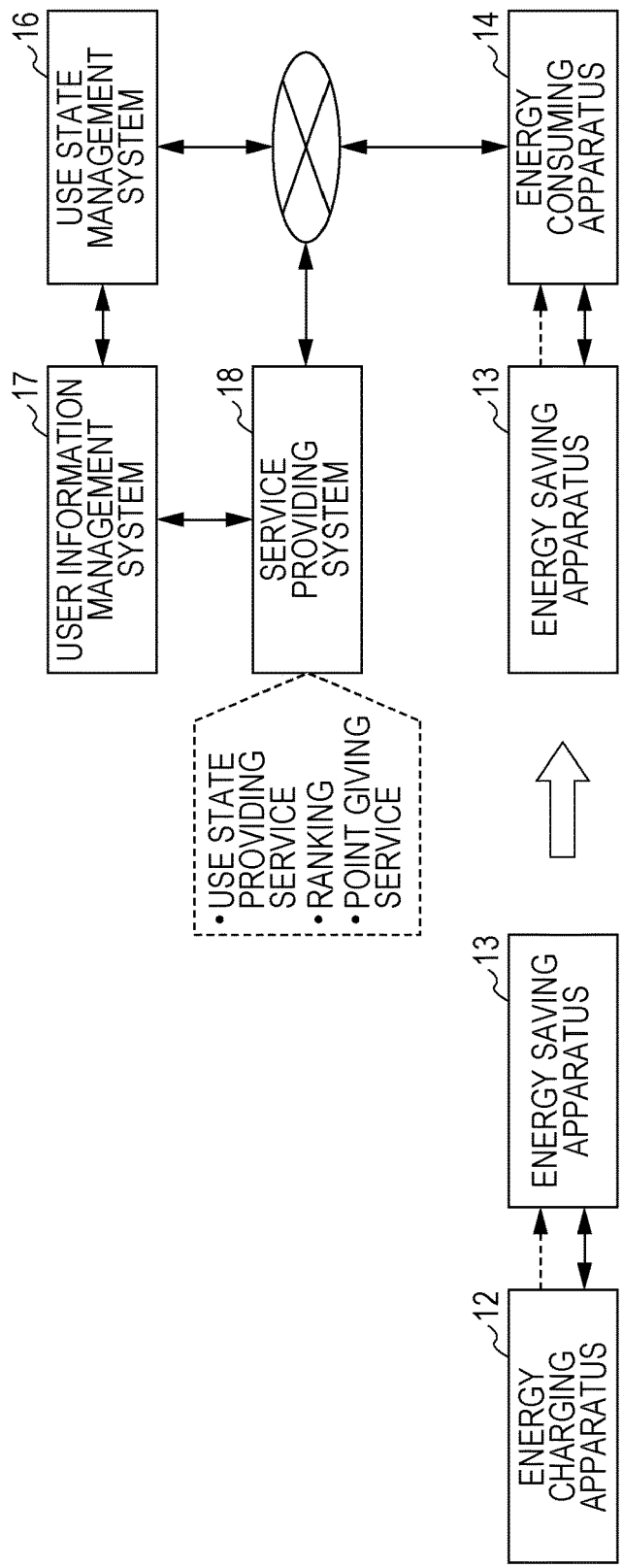
FIG. 24 is a diagram illustrating a usage example (use example #3) of a certificate.

For example, as shown in FIG. 24, it is preferable that a system configuration (usage example #3) can work the use state management system 16, the user information management system 17, and the service providing system 18. In the case of usage example #3, with respect to user A who has consumed green energy, the service providing system 18 may provide the use state of another user, present the ranking result of the consumed amount between users, or provide a service of giving points.

If users can confirm the use states of green energy, sense of competition between users occurs, and motives lead to the sustainable use of green energy.

Further, by presenting the ranking results to respective users, competition can lead to fuel the awareness among users, and a heightened awareness that actively try to use green energy is created. Since actual benefits are returned to users through giving points according to the consumed amount of green energy, it is expected that cost-conscious user consume green energy actively and continuously. As described above, by showing the user state of green energy or providing benefits to consumers, it is expected that replacement of non-green energy by green energy can proceed.

As infrastructure for realizing the construction as usage example #3, it is considered that the use of a social network is effective. As users, who see the use state or the ranking result, say using a social network, and saying in response is repeated in a chain reaction, it is considered that user motivation for consumption of green energy is maintained.

This construction is satisfied that there is a construction to prove that green energy is surely consumed in the energy consuming apparatus 14. That is, by applying the techniques in the form of the first to fourth embodiments as described above, it becomes possible to realize the system configuration according to usage examples #1 to #3.

7. Supplement

Up to now, the construction which issues a certificate when green energy is charged from the energy charging apparatus 12 to the energy saving apparatus 13 and confirms that the charged energy is green energy using the certificate when the green energy is consumed has been described. On the other hand, with respect to the construction that saves energy that is derived from a power system in the energy saving apparatus 13, detailed explanation is omitted. The green energy generation apparatus 11 such as solar power generation facilities has an energy output amount that is varied according to environments such as weather or the like. Because of this, it is preferable to install a construction that can save the energy derived from the power system in the energy saving apparatus 13.

For example, a construction is considered, in which a switch is installed in the energy charging apparatus 12 to switch a first mode in which energy that is derived from the power system is charged in the energy saving apparatus 13 and a second mode in which green energy is charged in the energy saving apparatus 13. In the first mode, the certificate is not issued, but energy is typically charged. On the other hand, in the second mode, the certificate is issued. Further, it is preferable that the energy charging apparatus 12 is configured to perform communication with HEMS in order to confirm that energy input thereto is green energy.

If communication with HEMS is performed, it is possible to acquire information on the amount of green energy generated by the green energy generation apparatus 11 and the amount of energy consumed by devices in the home. For example, if information can be acquired from HEMS, a construction can be realized which automatically charges energy in the energy saving apparatus 13 if the amount of energy generated by the green energy generation apparatus 11 exceeds the amount of energy consumed by the devices in the home.

Although the construction according to the first to fourth embodiments uses the certificate based on the technology such as electronic signature, a method of proving the green energy is not limited thereto. For example, in the case where the energy saving apparatus 13 is a battery, a method of attaching a seal for proving the saving of green energy to a terminal of the battery may be considered. Further, by reading a QR code printed on the seal through the energy consuming apparatus 14, a construction which has an additional usable function or receives service benefits may be considered.

Specific Examples of Apparatuses

The green energy generation apparatus 11, for example, may be solar power generation facilities, wind power generation facilities, geothermal power generation facilities, solar thermal power generation facilities, tidal power generation facilities, biomass power generation facilities, or the like. The energy saving apparatus 13 may be a battery, a capacitor, an energy storage system, or the like. The battery, for example, may be a lithium-ion battery, a nickel-metal hydride battery, a lead storage battery, a NAS battery, or the like. Further, the capacitor, for example, may be an electrolytic capacitor, a ceramic capacitor, an electric double layer capacitor, or the like.

Further, the energy storage system, for example, may be a lift power system, an energy storage system using electrolysis of water, or the like. The lift power system is an energy storage system that converts electric energy into potential energy and saves the converted positional energy. According to a hydraulic power generation system that is a representative example of the lift power system, water is pumped up and put into a high plate using electric power, and hydropower is performed using energy of water falling. On the other hand, according to the energy storage system using electrolysis of water, hydrogen that is generated by electrolysis of water is stored, and the stored hydrogen is burnt to generate power, or power is generated by fuel cells using the stored hydrogen as fuel.

The energy consuming apparatus 14, for example, may be a information processing device, a communication device, an imaging device, a television receiver, a video recording/reproducing device, a game machine, a music player, air conditioning facilities, an electric stove, an electric water heater, or other home appliances, which are used in the home or outside the home.

8. Overview

The technology according to the embodiments relates to an energy charging apparatus expressed as in (1) to (4), an energy saving apparatus expressed as in (5), an energy consuming apparatus expressed as in (6) to (13), and a method of managing green energy expressed as in (14) to (16). For example, the energy charging apparatus indicated in (1) can certify the amount of green energy that is charged in the energy saving apparatus through a certificate. Further, this certificate is discarded when green energy is output from the energy saving apparatus. Accordingly, it becomes possible to prove that the green energy stored in the energy saving apparatus is surely green energy through the certificate.

(1) An energy charging apparatus including an energy charging unit charging green energy in an energy saving apparatus; a measured amount information acquisition unit acquiring measured amount information that indicates a charged amount of green energy measured by the energy saving apparatus from the corresponding energy saving apparatus; and a certificate issuance unit issuing a certificate for certifying an amount of green energy charged in the energy saving apparatus when a charged amount of green energy charged by the energy charging unit coincides with the charged amount of green energy shown in the measured amount information, wherein the certificate is managed in association with the energy saving apparatus and is discarded if the amount of green energy that is certified by the corresponding certificate is output from the energy saving apparatus.

(2) The energy charging apparatus as described in (1), further including a certificate providing unit providing the certificate issued by the certificate issuance unit with respect to a management system managing the certificate, wherein the management system manages the certificate in association with the energy saving apparatus and discards the certificate if the amount of green energy that is certified by the corresponding certificate is output from the energy saving apparatus.

(3) The energy charging apparatus as described in (1), further including a certificate providing unit providing the certificate issued by the certificate issuance unit to the energy saving apparatus, wherein the energy saving apparatus preserves the certificate provided by the certificate providing unit and discards the certificate if the amount of green energy that is certified by the corresponding certificate is output.

(4) The energy charging apparatus as described in (2) or (3), wherein the measured amount information acquisition unit acquires an electronic signature together with the measured amount information and confirms validity of the measured amount information using the electronic signature, and the certificate issuance unit confirms the validity of the measured amount information and issues the certificate for certifying the amount of green energy charged in the energy saving apparatus if the charged amount of green energy charged by the energy charging unit coincides with the charged amount of green energy indicated in the measured amount information.

(5) An energy saving apparatus including an energy input unit for inputting energy; an energy output unit for outputting the energy; an energy saving unit saving the energy; a measured amount information generation unit measuring an amount of green energy input through the energy input unit and generating measured amount information that indicates the amount of green energy; a certificate request unit providing the measured amount information to an energy charging apparatus to which the green energy is input and requesting issuance of a certificate for certifying the input amount of green energy; a certificate acquisition unit acquiring the certificate from the energy charging apparatus; a certificate preservation unit preserving the certificate; and a certificate discard unit discarding the certificate if the amount of green energy that is certified by the corresponding certificate is output.

(6) An energy consuming apparatus including a measurement unit measuring an amount of green energy that is supplied from an energy saving apparatus if the green energy is supplied from the energy saving apparatus; a certificate acquisition unit acquiring a certificate managed in association with the energy saving apparatus and certifying the amount of green energy saved in the energy saving apparatus; and a certificate issuance unit issuing the certificate for certifying the amount of green energy that corresponds to a difference (Y–X) between the amount (X) of green energy supplied from the energy saving apparatus and the amount (Y) of green energy certified by the certificate if the amount (X) of green energy is smaller than the amount (Y) of green energy, wherein the certificate acquired by the certificate acquisition unit is discarded and the certificate issued by the certificate issuance unit is managed in association with the energy saving apparatus.

(7) The energy consuming apparatus as described in (6), wherein the certificate acquisition unit acquires the certificate from a management system that manages the certificate, and the energy consuming apparatus further includes a certificate providing unit providing the certificate issued by the certificate issuance unit to the management system.

(8) The energy consuming apparatus as described in (6), wherein the certificate acquisition unit acquires the certificate from the energy saving apparatus, and the energy consuming apparatus further includes a certificate providing unit providing the certificate issued by the certificate issuance unit to the energy saving apparatus.

(9) The energy consuming apparatus as described in (7) or (8), further including a function providing unit providing a first function that is usable when the energy consuming apparatus operates to receive green energy and a second function that is usable irrespective of the type of energy.

(10) The energy consuming apparatus as described in (7) or (8), further including a green energy amount notification unit notifying a service providing system providing an additional service depending on a consumed amount of green energy of the amount of green energy that is supplied from the energy saving apparatus, wherein the green energy amount notification unit notifies the service providing system of apparatus information for identifying a local apparatus and the amount of green energy in association with each other.

(11) The energy consuming apparatus as described in (10), wherein the service providing system acquires user information in which a user and the apparatus information are in association with each other and provides the additional service to the user corresponding to the apparatus information notified by the green energy amount notification unit.

(12) The energy consuming apparatus as described in (11), further including a state display unit acquiring a use state of the green energy for each user from the service providing system and displaying information that indicates the use state of the acquired green energy.

(13) The energy consuming apparatus as described in (12), wherein the service providing system ranks users in the order of the green energy amount used, and the state display unit displays the result of the ranking as the information that indicates the use state of the green energy.

(14) A method of managing green energy including charging, by an energy charging apparatus, green energy in an energy saving apparatus; acquiring measured amount information that indicates a charged amount of green energy measured by the energy saving apparatus from the corresponding energy saving apparatus; and issuing a certificate for certifying an amount of green energy charged in the energy saving apparatus if a charged amount of green energy charged in the energy saving apparatus coincides with the charged amount of green energy shown in the measured amount information, wherein the certificate is managed in association with the energy saving apparatus and is discarded if the amount of green energy that is certified by the corresponding certificate is output from the energy saving apparatus.

(15) A method of managing green energy including measuring an amount of input green energy and generating measured amount information that indicates the amount of green energy by an energy saving apparatus; providing the measured amount information to an energy charging apparatus to which the green energy is input and requesting issuance of a certificate for certifying the input amount of green energy; acquiring the certificate from the energy charging apparatus; preserving the certificate; and discarding the certificate if the amount of green energy that is certified by the corresponding certificate is output.

(16) A method of managing green energy including measuring, by an energy consuming apparatus, an amount of green energy that is supplied from an energy saving apparatus if the green energy is supplied from the energy saving apparatus; acquisition unit acquiring a certificate managed in association with the energy saving apparatus and certifying the amount of green energy saved in the energy saving apparatus; and issuing the certificate for certifying the amount of green energy that corresponds to a difference (Y−X) between the amount (X) of green energy supplied from the energy saving apparatus and the amount (Y) of green energy certified by the certificate if the amount (X) of green energy is smaller than the amount (Y) of green energy, wherein the acquired certificate is discarded and the issued certificate is managed in association with the energy saving apparatus.

Remarks

The energy output unit 123 is an example of the energy charging unit. The energy amount measurement units 122 and 132 are examples of the measured amount information acquisition unit. The certificate issuance determination unit 125 and the certificate issuance unit 126 are examples of the certificate issuance unit. The certificate issuance unit 126 and the communication unit 127 are examples of the certificate providing unit. The signature generation unit 134 is an example of the certificate request unit. The certificate preservation unit 135 is an example of the certificate acquisition unit. The energy amount measurement unit 145 is an example of the measurement unit. The certificate verification unit 141 is an example of the certificate acquisition unit. The certificate issuance unit 148 and the communication unit 144 are examples of the certificate providing unit. The energy consuming unit 143 is an example of a function providing unit. The communication device is an example of the green energy amount notification unit. The display device is an example of the state display unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of managing green energy comprising:
charging, by an energy charging apparatus, green energy received from a green energy source in an energy saving apparatus;
acquiring measured amount information that indicates a charged amount of green energy measured by the energy saving apparatus;
comparing a charged amount of green energy charged by the energy charging apparatus with the charged amount of green energy shown in the measured amount information; and
issuing a certificate for certifying an amount of green energy charged in the energy saving apparatus if the charged amount of green energy charged by the energy charging apparatus coincides with the charged amount of green energy shown in the measured amount information, or not issuing the certificate if the charged amount of green energy charged by the energy charging apparatus does not coincide with the charged amount of green energy shown in the measured amount information, wherein the certificate is managed in association with the energy saving apparatus and is discarded if the amount of green energy that is certified by the corresponding certificate is output from the energy saving apparatus.

2. A method of managing green energy comprising:
measuring an amount of input green energy received from a green energy source and an amount of saved energy;
requesting issuance of a certificate for certifying the input amount of green energy;
comparing the input amount of green energy to the amount of saved energy;
issuing the certificate if the input amount of green energy coincides with the saved amount of energy, or not issuing the certificate if the input amount of green energy does not coincide with the saved amount of energy;
acquiring the certificate;
preserving the certificate; and
discarding the certificate if the amount of green energy that is certified by the corresponding certificate is output.

3. A method of managing green energy comprising:
measuring, by an energy consuming apparatus, an amount of green energy that is received from a green energy source and supplied from an energy saving apparatus if the green energy is supplied from the energy saving apparatus;
acquiring a certificate managed in association with the energy saving apparatus and certifying the amount of green energy saved in the energy saving apparatus;
comparing the amount (X) of green energy supplied from the energy saving apparatus and the amount (Y) of green energy certified by the certificate; and
issuing the certificate for certifying the amount of green energy that corresponds to a difference (Y−X) between the amount (X) of green energy supplied from the energy saving apparatus and the amount (Y) of green energy certified by the certificate if the amount (X) of green energy is smaller than the amount (Y) of green energy, and not issuing the certificate if the amount (X) of green energy is larger than the amount (Y) of green energy,
wherein the acquired certificate is discarded and the issued certificate is managed in association with the energy saving apparatus.

* * * * *